United States Patent [19]
Stern

[11] Patent Number: 5,589,822
[45] Date of Patent: Dec. 31, 1996

[54] SYSTEM FOR DETECTING ICE OR SNOW ON SURFACE WHICH SPECULARLY REFLECTS LIGHT

[75] Inventor: Howard Stern, Greenlawn, N.Y.

[73] Assignee: Robotic Vision Systems, Inc., Hauppauge, N.Y.

[21] Appl. No.: 357,875

[22] Filed: Dec. 16, 1994

Related U.S. Application Data

[63] Continuation-in-part of PCT/US93/10035, Oct. 20, 1993, which is a continuation-in-part of Ser. No. 963,840, Oct. 20, 1992, Pat. No. 5,475,370.

[51] Int. Cl.$^6$ .................................................. G08B 19/02
[52] U.S. Cl. ........................................ 340/583; 356/369
[58] Field of Search ................................. 340/583, 962, 340/511; 73/170.26; 244/134 F; 356/381, 382, 369; 348/128, 143

[56] References Cited

U.S. PATENT DOCUMENTS

| | | | |
|---|---|---|---|
| 3,994,586 | 11/1976 | Sharkins et al. | 356/382 X |
| 4,701,052 | 10/1987 | Schoen, Jr. | 356/369 |
| 5,149,948 | 9/1992 | Chisholm | 235/462 |
| 5,177,346 | 1/1993 | Chisholm | 235/462 |
| 5,243,185 | 9/1993 | Blackwood | 340/583 X |
| 5,475,370 | 12/1995 | Stern | 340/583 |

OTHER PUBLICATIONS

Cornwell, Jr. et al., "Polarization–Sensitive Ice Detector for Rotary Wing Aircraft using Laser Diodes", NASA disclosure GSC13391–1, Oct. 1990.

*Primary Examiner*—Thomas Mullen
*Attorney, Agent, or Firm*—Thomas R. Morrison; Christopher R. Pastel

[57] ABSTRACT

A method and apparatus for detecting a presence of a polarization altering substance on a specular surface includes transmitting light to the surface over a transmitting path and receiving the transmitted light from the surface and from the polarization altering substance. An intensity of the light is measured in an optical non-isolator state and in an isolator state before being compared to reference data established for various specular surfaces. The reference data are preferably established by measuring an intensity of the light in both an optical non-isolator state and in an isolator state for a known surface when the polarization altering substance is absent from the known surface.

26 Claims, 21 Drawing Sheets

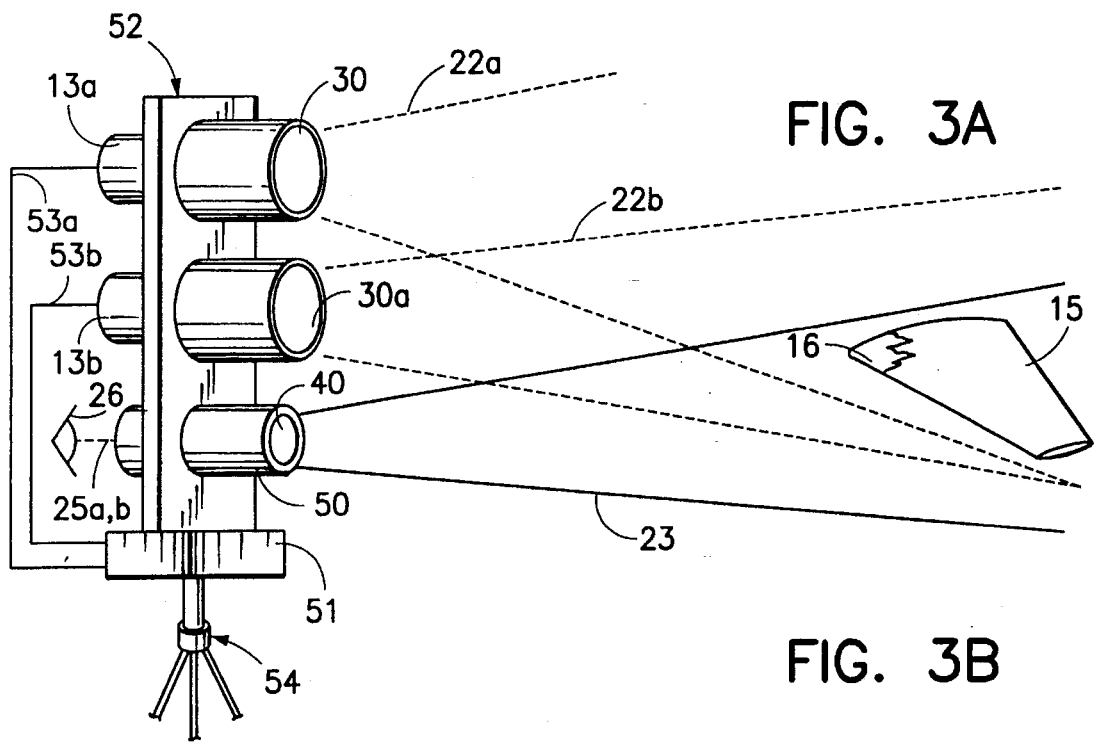
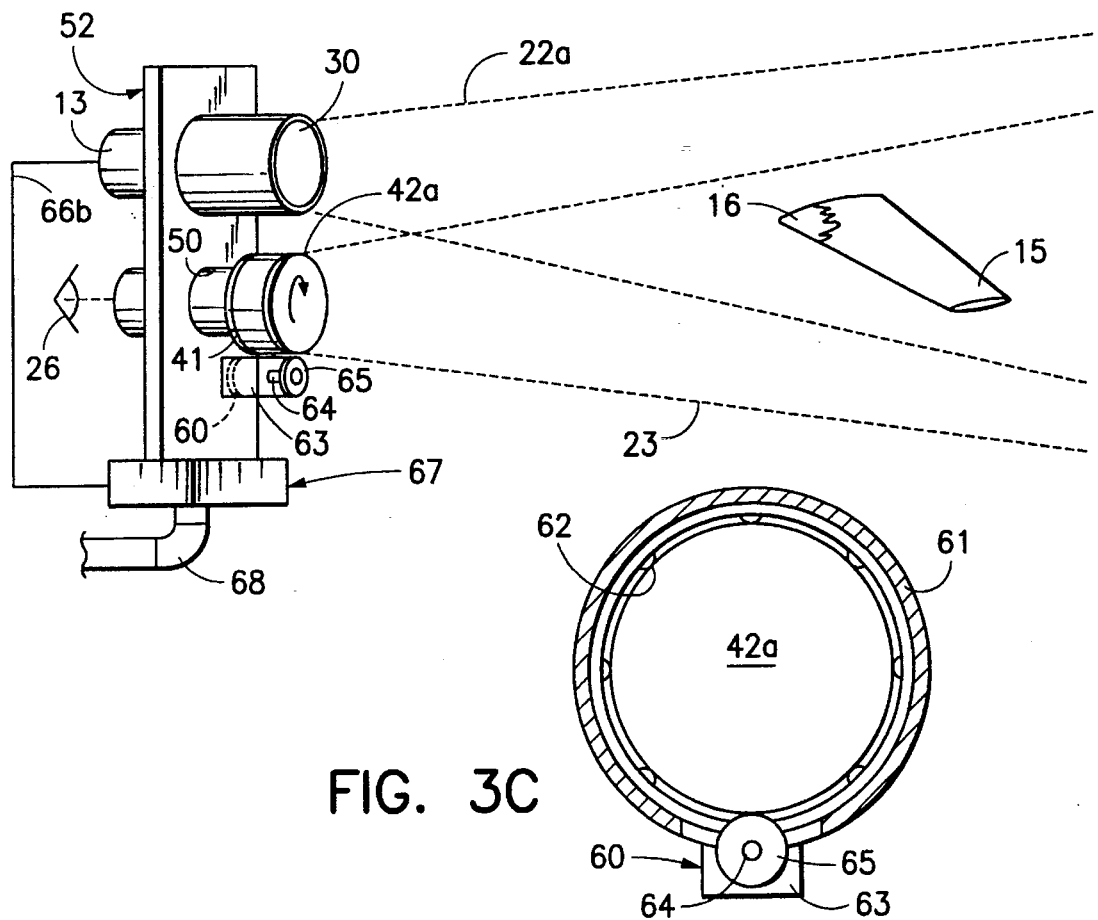

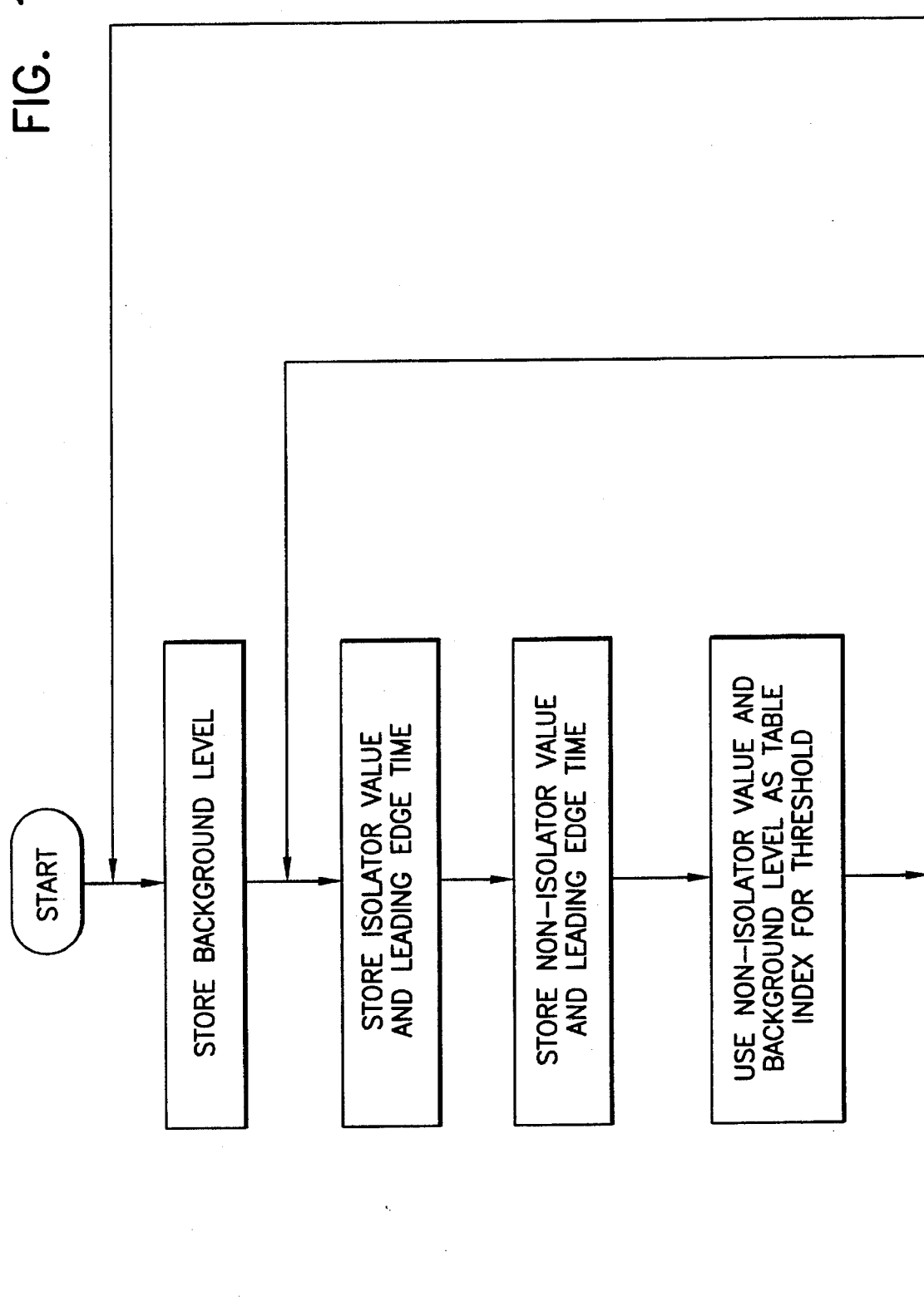

Range Correction Output = Input + K x Log(Range/Ref Range) K~2
Threshold Calc Based On Table Interpolation
or Function Generating Fig. 18 Values Range Correction Output = Input + K x Log(Range/Ref Range)  K~2

Threshold Calc Based On Table Interpolation
or Function Generating Fig. 20 Values Eval Func = (Non-Blocking – Blocking)/(Non-Blocking + Blocking)
Both Range Corrected or Both Before Range Correction Calc Thresh Must Use Range Corrected Non-Blocking

SYSTEM FOR DETECTING ICE OR SNOW ON SURFACE WHICH SPECULARLY REFLECTS LIGHT

RELATED APPLICATIONS

This application is a continuation-in-part of PCT application US93/10035 filed Oct. 20, 1993, which in turn is a continuation-in-part of application Ser. No. 07/963,840 filed Oct. 20, 1992, now U.S. Pat. No. 5,475,370, both of which are assigned to the same assignee as the subject application.

BACKGROUND OF THE INVENTION

Current airport aviation practices depend on the use of de-icing fluid to remove ice and prevent its future build-up for time periods of 5–10 minutes. Verification that wing and other aerodynamic or control surfaces are ice free is done visually, often under difficult viewing conditions. Occasionally significant ice build-ups are not noticed, with tragic results. Responsibility for detecting such ice rests with the aircraft crew who rely on visual viewing, perhaps supplemented with an ordinary flashlight. Obviously, a need exists for a system which is capable of accurately and easily determining the presence of ice on an aircraft wing.

Metallic surfaces and dielectric surfaces behave differently when illuminated with light, particularly with respect to their polarization properties. One of the strongest differences and most easily observable is the property of metals to reverse the rotational direction of circularly polarized light. For example, the specular reflection of right handed (clockwise looking towards the source) circularly polarized light from a metal surface changes it to left handed (counterclockwise) polarization and vice versa. This effect is used in the construction of optical isolators which permit light to initially pass through the isolator but prevent specularly reflected light from returning through the isolator back to the source. The optical isolator is a circular polarizer that is usually implemented from a linear polarizer and a quarter wave retarder plate that has its fast and slow axes located 45° from the polarization axis of the polarizer. The polarizer must precede the retarder in the light path.

When a metallic surface (or surface painted with a metallic paint), such as the wing of an aircraft, is illuminated with circularly polarized light (which may be generated by passing unpolarized light through a circular polarizer) and the reflected energy viewed through the same circular polarizer, the resulting image is extremely dim since the circular polarizer is performing as an isolator with respect to the specular reflection from the metal surface. Other types of surfaces (birefringent, certain dielectric, matte, etc.) viewed through the same circular polarizer maintain their normal brightness because upon reflection they destroy the circular polarization. If the circular polarizer is flipped (reversed) so that the retarder precedes the polarizer, it no longer acts as an isolator for the illuminating beam and the metallic surface's image will now be viewed of normal (bright) intensity.

Most non-metallic and painted or matte surfaces illuminated with circularly polarized light and viewed through the same circular polarizer will maintain their normal intensity. Such surfaces, as well as a coat of ice on the metal, whether matte white due to a snow covering or crystal clear due to even freezing will destroy the circular polarization of the reflected light and therefore take on the depolarizing property of a matte painted surface with respect to the optical isolator. A transparent dielectric over metal depolarizes circularly polarized light passing through it if it has numerous internal point scatterers or is birefringent. Ice has this characteristic. Thus, circularly polarized light reflected from a painted surface, snow, ice, or even transparent ice over metal will be depolarized and will not be affected by the isolator.

Therefore, the image of a clear metal surface that is ice-free will alternate between dark and bright when alternately viewed through an isolator and non-isolator structure, respectively. Apparatus other than the combination of optical isolators and non-isolators can produce the same effect. Any ice or snow covering the metal surface will cause the image to maintain the same brightness regardless of whether it is viewed through an isolator or non-isolator structure or equivalent structures.

SUMMARY OF THE INVENTION

The present invention provides various arrangements for inspecting a metal surface for the presence of ice which compares views of the surface in an optical isolating and non-isolating manner. Making such comparisons in an alternating manner results in the metal surface producing a blinking, on-off, viewing of the reflected light and the ice producing a steady level of illumination.

In accordance with the invention, various embodiments are provided for inspecting a metallic surface in which there is a comparison or switching between an optical isolator structure and non-isolator structure. In one embodiment, switching is implemented by switching the light illuminating the metal surface between circularly polarized and non-circularly polarized light while observing through a circular polarizing filter of the same hand, i.e., CW or CCW, as required to complete the isolator. In another embodiment, the light illuminating the surface may be kept circularly polarized but viewed alternately through a circular polarizer of the same hand and a non-circular polarizing element having the same optical attenuation. This is most easily accomplished by viewing through the same type of circular polarizer flipped over (reflected light enters the polarizing element first) to keep it from acting as the circular polarizer to elements of an isolator while simultaneously maintaining the slight light attenuation of its linear polarizer element.

Another embodiment maintains the illumination in a circularly polarized state and alternately views the scene through right handed and left handed circular polarizers which will alternately change between the isolating and non-isolating states. A non-isolating state may also be achieved by rotating either the receiver or transmitter quarter wave retarder plate forming a part of the polarizer by 45°. This aligns the slow or fast axis of the retarder with its polarizer. The effect is that, if done at the transmitter, linearly polarized light passing through the quarter wave plate remains linearly polarized and if done at the receiver, circularly polarized light (which passes through the retarder plate first) emerges linearly polarized at 45° to the original direction—it can then pass through the linear polarizer with just slight attenuation.

Rotation of either the transmitter or receiver quarter wave retarder by 90° from the position in which it serves to operate as an isolator also changes the state to non-isolating because the specularly reflected circularly polarized wave is then exactly aligned with the receiver polarizer as it emerges in the linearly polarized form from the receiver's quarter wave retarder. Isolating and non-isolating states may also be achieved by various combinations of crossed and aligned linear polarizers, respectively.

Since the reflected light from a specular surface is highly directional, it is beneficial to minimize any change in illumination angle when changing from isolator to non-isolator state. Otherwise a change in reflected light intensity caused by a change in illumination angle may be interpreted as caused by the isolator/non-isolator effect and an erroneous decision made. The high directionality of specular reflection also introduces the need to accommodate a large dynamic range of received light intensities. If not properly handled, erroneous decisions could be made as a result of saturation due to high light levels within the receiver.

Background light such as sunlight must be removed from influencing the final clear/ice surface decision or the system will be limited to operation in low light levels. Light reflected from surfaces other than the aircraft wing, such as the ground, when viewing downward on the wing must also be removed in order to provide an unmistakable image of the wing and any patches of ice on it.

Specular surfaces that can be viewed close to the surface normal provide a relatively high isolator/non-isolator ratio and therefore a clear demarcation between the two light levels. However, as the surface is viewed at angles away from normal to the surface, which is necessary for a system viewing from a fixed location, the ratio drops and the reflected light effect becomes closer to that produced by reflection from ice, making it more difficult to reliably distinguish between the two.

The preferred embodiment of the invention provides a novel method and apparatus for an enhanced way of determining the surface conditions, that is, the presence or absence of ice or snow. This is accomplished by comparing the amplitude value of the received reflected signal when the optical system is in a non-isolating state with the ratio of the non-isolating state to isolating state amplitude values or the ratio of the difference and the sum of these two values. A threshold curve demarcating the surface clear to ice/snow presence conditions is provided as a function of the non-isolating state amplitude value and one of the two aforesaid ratios. This curve is generated from data of received signal amplitude values in the non-isolating and isolating states with the illuminating source being at different angles relative to the surface.

Circuits are also provided to process and evaluate the received signal amplitude values in logarithmic form to aid in analysis and to easily accommodate for differences in the distance between the illuminating source and the surface.

OBJECTS OF THE INVENTION

It is therefore an object of the present invention to provide an apparatus for detecting the presence of a depolarizing dielectric material, such as ice or snow, on a metal specular reflecting surface.

A further object is to provide a system for detecting ice or snow on the metal (or metallic painted) wing of an aircraft.

An additional object is to provide a system for detecting ice or snow on a metal (or metallic painted) surface which is specularly reflective to light using circularly or linearly polarized light.

Yet another object is to provide a system for detecting ice or snow on a metal or metallic painted surface in which optical means are used to produce an on-off light blinking response for a metal surface and a steady light response for any part of the surface covered with ice or snow.

A further object is to provide a process and apparatus to overcome system limitations brought about by ambient light, the large dynamic range of light intensities, and the poor response of metal surfaces viewed away from a direction normal to the surface.

Still a further object is to provide a novel method and apparatus in which the surface condition is determined by comparing the amplitude value of the received signal in a non-isolating state of the system optics to a ratio of the received signal amplitude values in the non-isolating and isolating state or a ratio of the difference and the sum of these two values.

Other objects and advantages of the present invention will become more apparent upon reference to the following specification and annexed drawings.

BRIEF DESCRIPTION OF THE DRAWINGS

FIG. 3A is a schematic view of an ice detection apparatus based on direct visual observation using two spot-light illuminators, one polarized and one not;

FIG. 3B is a schematic view of an ice detection apparatus based on direct visual observation which uses one circularly polarized light source;

FIG. 3C is a detail of the FIG. 3B apparatus for switching the polarizer between isolating and non-isolating states in the detection path;

FIG. 16A, 16B and 16C together comprise a flow diagram of the process for categorizing the measured values as clear, ice, and non-ice;

DETAILED DESCRIPTION OF THE INVENTION

Figure 1A:
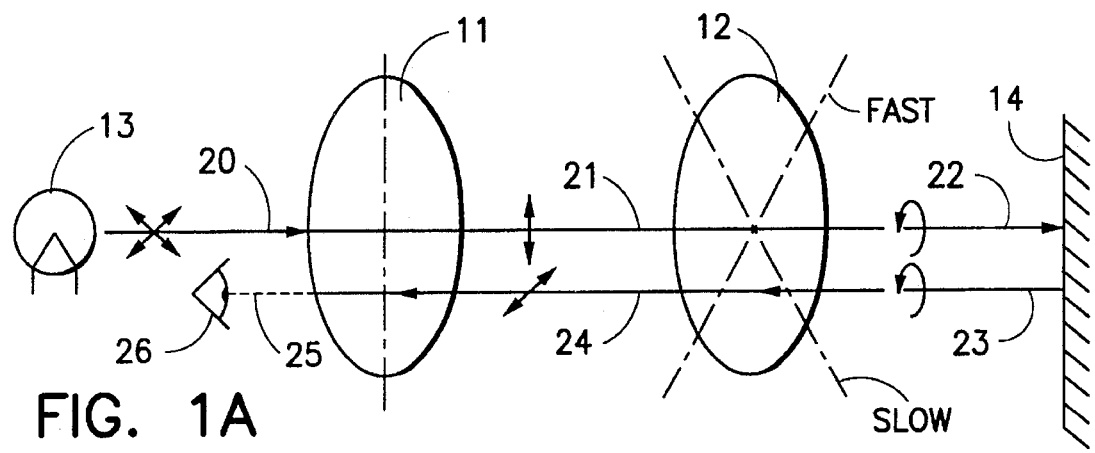
FIG. 1A is an optical schematic of a circular polarizer with the linear polarizer facing the illumination source so that the polarizer acts as an optical isolator.

FIG. 1A illustrates the operation of a circular polarizer used as an isolator. Light is emitted from an unpolarized light source 13, which preferably is as close to monochromatic as possible. The light is shown as unpolarized by the arrows in two orthogonal directions along ray path 20, the path the light is following. The unpolarized light passes through a linear polarizer 11 which has a vertical polarization axis. The light passing through linear polarizer 11 takes ray path 21, along this path illustrated as vertical polarization by the double arrow.

The vertically polarized light at ray path 21 passes through a quarter wave retarder plate 12. The retarder 12 is a plate made from birefringent material, such as mica or crystal quartz. Its purpose is to change linearly polarized light from polarizer 11 into circularly polarized light. Any ray incident normal to the retarder plate 12 can be thought of as two rays, one polarized parallel to the parent crystal's optic axis (e-ray) and the other perpendicular (o-ray). The e-ray and o-ray travel through the plate 12 at different speeds due to the different refractive indices. The plate 12 is said to have a "fast" and a "slow" axis.

The quarter wave retarder plate 12 has its slow and fast axes both at 45° relative to the vertical axis of the linear polarizer 11 so that the emerging circularly polarized light from plate 12 along ray path 22 is rotating in a CCW direction as viewed facing the light source from a reflecting surface 14. A metallic surface, which is a specular reflector, and a dielectric surface, i.e., ice or snow, behave differently when illuminated with light, particularly with respect to their polarization properties. A strong and easily observable difference is the ability of a metal to reverse the rotational direction of incident circularly polarized light. The specular reflection of right-handed (CW) circularly polarized light from a metal surface changes into left-handed (CCW) polarization and vice versa.

This effect is used in the construction of optical isolators which permit light to initially pass through the isolator but prevent such light when specularly reflected from returning through the isolator back to the light source. When the optical isolator is a circular polarizer it is usually implemented from a linear polarizer and a quarter wave retarder plate that has its fast and slow axes located 45° from the polarization axis of the polarizer.

In FIG. 1A, surface 14, which is a specular surface, reflects the incident circular polarized light back along ray path 23. The reflected light continues to rotate as viewed from the surface 14 in the CCW direction but has now changed "hand", in terms of right hand and left hand, because it is rotating in the same direction with its direction of travel changed.

The reflected light on ray path 23 passes through the quarter wave retarder 12 and emerges no longer circularly polarized but linearly polarized in the horizontal direction, which is shown along ray path 24. Because the light at ray path 24 is horizontally polarized it is not passed by the (vertical) linear polarizer 11. Therefore, none of the specularly reflected light gets through to ray path segment 25 to enter the eye 26, which is shown near the location of the light source 13. Thus, the quarter wave retarder plate 12 acts as an optical isolator. That is, light from the light source 13 is passed through the circular polarizer and reflected by the specular surface 14 but cannot pass through the circular polarizer back in the other direction and so is blocked before it gets to the eye.

Figure 1B:
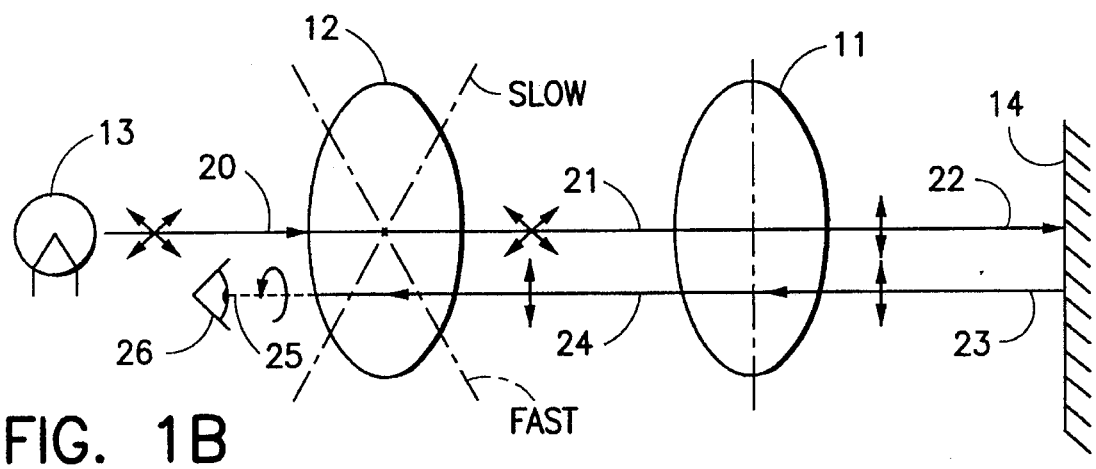
FIG. 1B is an optical schematic of a circular polarizer with the quarter wave plate facing the illumination source so that it passes specularly reflected light, i.e., it is a non-isolator.

FIG. 1B shows the same quarter wave plate and linear polarizer combination used, but the sequence of the elements is reversed. Here, the quarter wave retarder plate 12 is facing the light source 13 and the linear polarizer 11 is facing the output side towards the reflecting surface 14. The light rays now emerge from light source 13 in an unpolarized form along ray path 20 and pass through the quarter wave plate 12. However, because the light is not polarized the quarter wave plate 12 does not change any polarization properties. The light then passes through the linear polarizer 11 and becomes vertically polarized along ray path 22.

Surface 14 specularly reflects with the same polarization the vertically polarized light which travels along ray path 23 back towards the linear polarizer 11 with the same polarization. The light now enters the quarter wave retarder plate 12. Because the light entering plate 12 is polarized in the vertical direction, it emerges from the quarter wave plate circularly polarized. However, this is of no consequence to the eye 26, so the eye sees the light that has been reflected from the surface 14. Thus, in this case with the light first entering the quarter wave plate 12 and then passing through the linear polarizer 11 and being specularly reflected back to the eye through the linear polarizer and the quarter wave plate, there is little loss in the light intensity.

As can be seen in the comparison of FIGS. 1A and 1B, light from the same light source 13 reflected from the specular reflection surface 14 is viewed by the eye 26 either dim or bright depending upon the location of the quarter wave retarder plate 12 relative to the linear polarizer 11. That is, FIG. 1A effectively is an optical isolator while FIG. 1B is a non-isolator.

Figure 2:
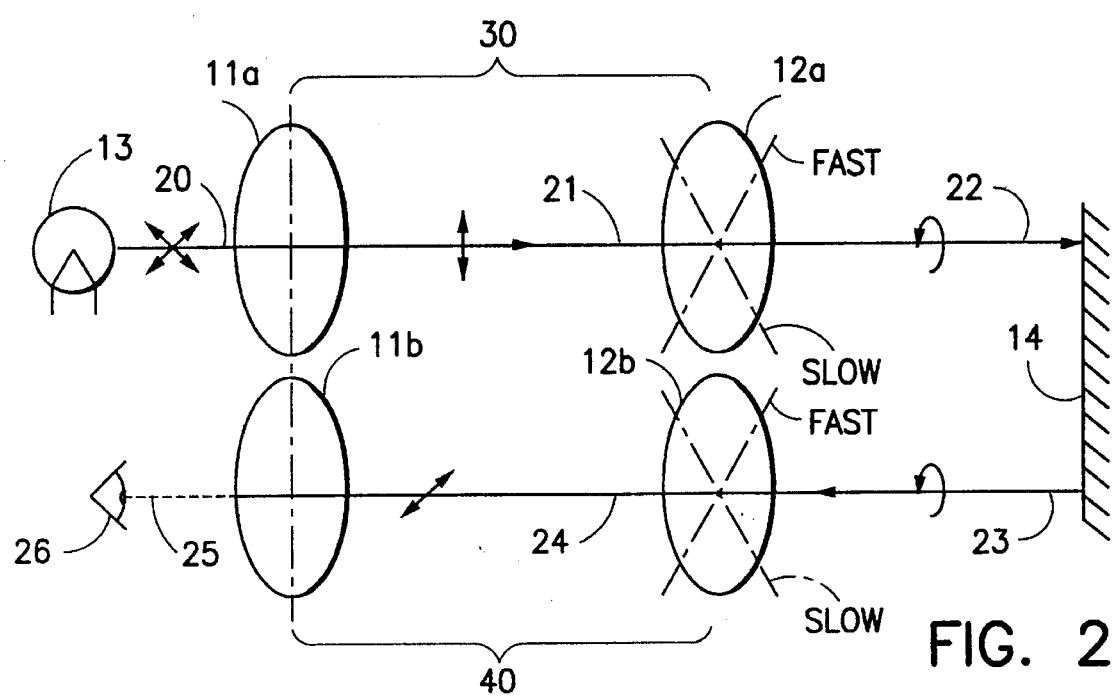
FIG. 2 is an optical schematic of two circular polarizers, one in the transmit path and one in the detection path, that together form an optical isolator.

FIG. 2 shows the same implementation of a circular polarizer as in FIG. 1A, with the receive path and the transmit path each having their own circular polarizers 30 and 40. Both circular polarizers are in the same order. That is, both linear polarizers 11a and 11b are on the left, one adjacent to the light source 13 and the other the eye 26, and both quarter wave retarders 12a, 12b are on the right adjacent to the reflective surface. Thus, as shown, the light from light source 13 enters the linear polarizer 11a, exits vertically polarized, passes through the quarter wave plate 12a and emerges rotating CCW as viewed from the specular reflecting surface 14. The light reflects off the surface 14 still polarized rotating CCW as viewed from surface 14 and passes through the circular polarizer 40 in the return direction path to enter quarter wave plate 12b, from which it exits horizontally polarized to the vertical linear polarizer 11b which blocks the light. Linear polarizer 11b in the reception leg is distinct and separate from the linear (vertical) polarizer 11a that was used in the transmit leg. Because the polarization of the light ray along ray path 24 is horizontal, the light does not pass through the linear polarizer 11b and cannot enter the eye 26.

When a metallic surface, such as the wing of an aircraft, is illuminated with circularly polarized light produced by the device of FIG. 1A and the reflected energy viewed through the same circular polarizer the resulting image is extremely dim since the circular polarizer is performing as an isolator with respect to the specular reflection of the circularly polarized light (of opposite hand) from the metallic surface.

A painted portion (non-specular) of the surface illuminated with circularly polarized light does not reflect light in a polarized form. Instead, it destroys the circular polarization and makes the reflected light unpolarized. Thus, the unpolarized light reflected from a painted surface portion when viewed through the same circular polarizer of FIG. 1A will maintain its normal intensity. The same holds true for circular polarized light reflected from a wing covered by ice or snow. However, other common harmless substances such as water or de-icing fluid that may be on the wing do not destroy the circular polarization of the reflected light.

As explained with respect to FIG. 1B, the components of the circular polarizer of FIG. 1A are flipped (rotated) such that the retarder plate 12 precedes the linear polarizer 11 with respect to the light source 13, so it no longer acts as a circular polarizer to an illuminating beam. Accordingly, the reflection of circular polarized light from the metal surface will pass back to the eye and will be of normal (bright) intensity. The image intensity of such light reflected from a painted or dielectric (non-specular) surface also will be unchanged as in the previous case.

When a metallic surface is alternately illuminated and viewed by the isolator and non-isolator devices of FIGS. 1A and 1B, the return images at the eye 26 will alternate between dark and bright. A painted or dielectric non-specular surface will remain uniformly bright to the alternation since the light reflected from the painted or dielectric surface is not polarized and will not be isolated.

Assuming that a metallic surface has a patch of ice thereon or is coated with ice, the ice being either matte white due to snow covering or crystal clear due to even freezing, the circular polarization of the reflected light is destroyed and therefore takes on the property of a matte painted surface with respect to the optical isolator. That is, referring to FIG. 1A, if there is ice on any portion of the specular surface 14, then the circularly polarized light along ray path 22 impinging upon such portion of the surface will not have its polarization reversed. Instead, it will have the effect of a painted surface so that the returned light will be non-polarized and will pass to the eye, i.e., the returned image will be bright.

Accordingly, upon alternately illuminating and viewing an ice-free metallic surface 14 with the circular polarizer-isolator of FIG. 1A and the non-isolator of FIG. 1B, the return viewed by the eye 26 will alternate between dark and bright respectively. Any ice or snow covering a portion of the metal surface 14 will cause that portion of the image to maintain the same brightness regardless of whether it is viewed through an isolator or non-isolator structure upon such alternate illumination and viewing.

Switching between an isolator structure, e.g., FIG. 1A, and non-isolator structure, e.g., FIG. 1B, may be implemented by switching the light illuminating the metallic surface between circularly polarized and non-circularly polarized light while observing through a circular polarizing filter of the same hand, i.e., CW or CCW, as required to complete the isolator. As an alternative, the light illuminating the metallic surface may be kept circularly polarized but viewed alternately through a circular polarizer of the same hand and a non-circular polarizing element having the same optical attenuation. This is most easily accomplished by viewing through the same type of circular polarizer flipped over (reflected light enters the polarizer element first) to keep it from acting as the circular polarizer to elements of an isolator while simultaneously maintaining the slight light attenuation of its elements.

Another arrangement is to maintain the illumination in a circularly polarized state. Thereafter, the surface would alternately be viewed through right-handed and left-handed circular polarizers which alternately change between the isolating and non-isolating states.

A non-isolating state also may be achieved by rotating either the receiver or transmitter quarter wave retarder plate 12 by 45°. This aligns the slow or fast axis of the retarder with its linear polarizer. The net effect is that, if done at the transmitter, linearly polarized light passing through the quarter wave plate remains linearly polarized. If done at the receiver, circularly polarized light (which passes through the retarder plate first) emerges linearly polarized at 45° to the original direction. It can then pass through the linear polarizer to be viewed with just slight attenuation.

Rotating either the transmitter or receiver quarter wave retarder by 90° from the position in which it serves to operate as an isolator also changes the state to non-isolating because the specularly reflected circularly polarized wave is then exactly aligned with the receiver polarizer as it emerges in linearly polarized form from the receiver's quarter wave retarder.

The following table illustrates the implementation that may be used when alternating either the illumination (transmitter) or receiver (detector) polarizing elements or vice versa to change the overall path from an isolator to a non-isolator structure:

| Between Transmitter and Surface (or Surface and Receiver) | Between Surface and Receiver (or Transmitter and Surface) |
| --- | --- |
| CW only | [CW, LP] [CW, UP] [CW, CCW] |
| CW, LP | CW |
| CW, UP | CW |
| CW, CCW | CW or CCW |
| LP | LP+, LP− |
| LP, UP | LP− |

In the table above the following abbreviations are used;
CW Clockwise polarization—(Right handed)
CCW Counter Clockwise polarization—(Left handed)
LP Linear polarization
LP+ Linear polarizer aligned with LP
LP− Linear polarizer at blocking angle (e.g. 90°) to LP
UP Unpolarized
Alternating states are separated by commas.
Equivalent sets of alternating states are isolated by square brackets.
In any row CW and CCW may be interchanged. In any row CW may be replaced by RH (right hand) and CCW by LH (left hand).
The columns can be interchanged, i.e., the action can be either on the transmitter or receiver leg.

The table shows that when using linear polarization the isolating state refers to the receiving polarizer being orthogonal to the polarization of the transmitted energy beam and the non-isolating state refers to any of the following conditions:

a) non-polarized transmission b) no polarizer in receiver path c) polarizer in receiving path is approximately aligned with the polarization of the transmitted beam.

FIG. 3A is a schematic view of a monocular version of an ice detection system suitable for night use based on direct visual observation. The direct visual observation receiver uses a non-inverting telescope 50 with a circular polarizer 40, like the circular polarizer of FIG. 1A, at its entrance. Two spotlights 13a, 13b are used for the source of illumination, i.e., the transmitter. One spotlight 13a has a circular polarizer 30 isolator, like FIG. 1A, mounted to it. The other spotlight 13b has a neutral density filter such as a "same hand" circularly polarized filter 30a mounted backwards so that the light coming through is linearly and not circularly polarized, i.e., like the non-isolator of FIG. 1B.

The two spotlights 13a, 13b illuminate a common overlapping area of a surface shown as the entire area or a portion of an aircraft wing 15 having a patch 16 of ice thereon. The clear (no ice) portions of the wing 15 form a specular reflecting surface such as the surface 14 of FIGS. 1A and 1B. The wing 15 is observed by the field of view 23 of the non-inverting telescope 50. Both spotlights 13a, 13b and the non-inverting telescope 50 are mounted on a support structure 52, which in turn is mounted to a tripod or boom 54. A power supply and sequencer 51 for the spotlights 13a, 13b is also located on the tripod boom structure. Two outputs from the sequencer 51 are taken along wires 53a and 53b to connect with and alternately energize the spotlights 13a and 13b, respectively.

The eye 26 is shown looking through the telescope 50. The field of view of the upper spotlight 13a is shown as fan 22a and that of the lower spotlight 13b as fan 22b. The region observed by the non-inverting telescope 50 is formed from the fan of rays reflected back from wing 15 into the telescope 50 within field of view 23.

In operation, the sequencer 51 alternates between sending a voltage to and alternately energizing spotlight 13a and then spotlight 13b during corresponding time periods "a" and "b". When the voltage is applied to spotlight 13a the outgoing light is circularly polarized by polarizer 30 and the light emerges in fan 22a which illuminates the aircraft wing surface 15. The light from fan 22a reflected from the aircraft wing 15 passes back through field of view 23 into the circular polarizer 40 of non-inverting telescope 50 where it may be viewed by the eye 26 during the interval "a". During the period "a" an optical isolator arrangement is in place because there are two circular polarizers 30 and 40 in the path. This is shown in FIG. 2. That is, metal areas of the wing which produce a specular mirror like reflection reverse the "hand" of the incident circularly polarized light and prevent it from passing back through the isolator. Therefore, the eye 26 sees a very dark region covering the aircraft wing, except where there is ice, which is shown on patch 16 of the aircraft wing and which area will show brighter to the eye through the telescope.

When spotlight 13a is turned off and spotlight 13b is turned on during period "b", the light emerging from spotlight 13b is not circularly polarized. Now the reflection coming back to telescope 50 from both the areas with ice or a metal area without ice will approximately maintain their normal brightness. Thus as the sequencer 51 alternately energizes the spotlights 13a and 13b, the image at the eye 26 from any area that is metal, specular, and ice free will appear to blink on and off. This will be "on" (bright) when the optical isolator is not in operation and "off" (dark) when isolation exists. However, areas that have ice will not blink and will have essentially constant brightness, because the polarized light produced during period "a" is depolarized upon impinging and being reflected from the ice or the metal under the ice.

Figure 10A:
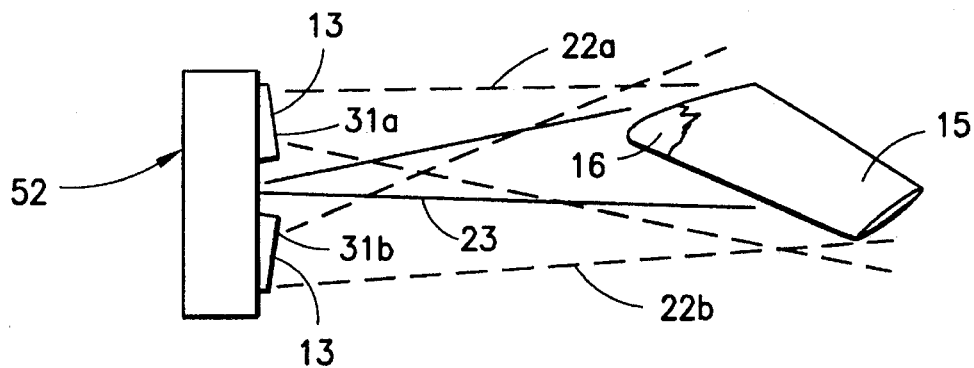
FIG. 10a is a side view of an ice detection system light projector/receiver viewing an aircraft wing.

FIGS. 10a–10f illustrates a concentric arrangement of illuminating light sources 13 surrounding a camera 80 all mounted in a support structure 52 forming an ice detection system suitable for daylight use. FIG. 10a shows a side view of structure 52 with light beams in fans 22a and 22b aimed toward aircraft wing 15 with a patch of ice 16. Reflected light from surfaces of wing 15 and patch 16 are collected within the field of view 23 of camera 80 mounted on structure 52. Light sources 13 contain sources of linearly polarized light that project light through quarter wave retarder windows 31a and 31b shown in side edge view in FIG. 10a to produce beams in fans 22a, 22b. Windows 31a and 31b are tilted away from the optic axes of beams 22a and 22b respectively, in order to prevent light reflections from aircraft surfaces 15 (metal) and 16 (ice) from being redirected from windows 31a, 30b back towards surfaces 15 and 16.

The combination of linearly polarized light from sources 13 and quarter wave retarder windows 31a, 30b produce circularly polarized light beams in fans 22a and 22b. Reflected light from the non-ice covered surface of wing 15 is circularly polarized whereas light reflected from ice patch 16 is substantially unpolarized.

Figure 10B:
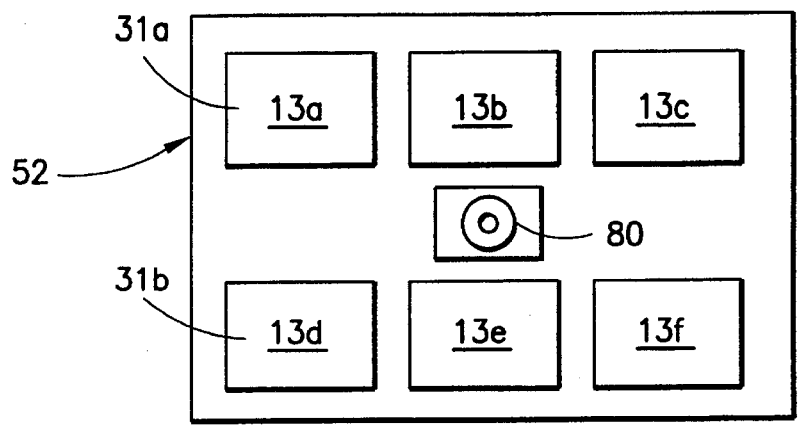
FIG. 10b is a front view of the light projector/receiver.
Figure 10C:
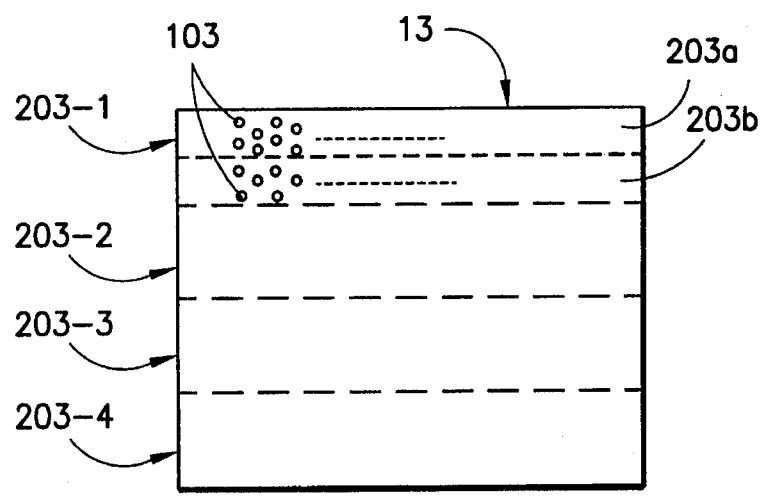
FIG. 10c is a front detail view of one light source.

FIG. 10b shows a front view of structure 52 with six light sources 13a–13f surrounding camera 80. Each light source 13 is similar in construction and has an array of linearly polarized light sources behind quarter wave retarder window 31a. As shown in FIG. 10c, each light source 13 has four similar segments 203-1 through 203-4. Each segment 203 has two assemblies 203a and 203b that have a plurality of linearly polarized light sources 103. Each light source 103 is, for example, an LED (such as AND180CRP which produces an 8° beam) mounted behind a linear polarization filter. The polarization axis of the filter is preferably oriented at 45° to the vertical to minimize preferential reflection of the light from the surface 15 to be illuminated. The polarization axes of the filters on assemblies 203a and 203b are mounted orthogonal to each other to provide the basis for distinguishing areas containing ice such as patch 16 on wing surface 15.

Assemblies 203a and 203b are placed in close proximity to assure that the light projected from each impinge on wing surface 15 at nearly equal angles of incidence to minimize differences in reflected energy and to provide the largest possible depth over which the beams of light from each assembly 203a and 203b coincide. Assemblies 203a and 203b are preferably independently adjustable in two directions to enable alignment of the light beams from these assemblies. They can each be tilted vertically and rotated horizontally by amounts to provide overlap of the beams from light sources 13a through 3f.

Figure 10D:
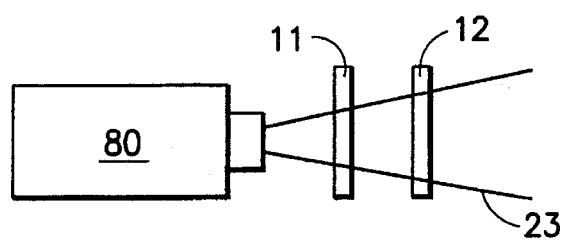
FIG. 10d is a schematic view of the receiver portion of the ice detection system.

FIG. 10d shows camera 80 with associated quarter wave retarder plate 12 to convert circularly polarized light received within camera view angle 23 to linearly polarized light that can be blocked by linear polarizer 11 (when the polarization is orthogonal to the polarization axis).

During operation of the system of FIGS. 10a–10d, all assemblies 203a of light sources 13 are strobed to produce light circularly polarized of one hand. Then when camera 80 is ready to record the next image, all assemblies 203b of light sources 13 are strobed to produce light circularly polarized of the other hand. Specularly reflected light from the metal part of wing surface 15 will be rejected in one image and not in the other, creating a blinking effect. Light reflected from ice patch 16, however, will be substantially non-polarized and recorded in all images formed within camera 80 without a blinking effect.

The images can then be directly displayed on a TV monitor for an observer to determine if any ice is present. The images also can be processed and presented to an observer as enhanced images clearly defining areas where ice patch 16 is present on wing surface 15.

An alternate arrangement to that shown in FIGS. 10a–10d is to omit quarter wave retarding plate windows 30a and 30b from the light sources 13, and quarter wave retarding plate 12 from camera 80. Linear polarizer 11 will reject light reflected from clear portions of surface 15 when the projected polarization is orthogonal to its polarized axis and pass light from the same surface when the projected polarization is aligned to its polarization axis.

Figure 10E:
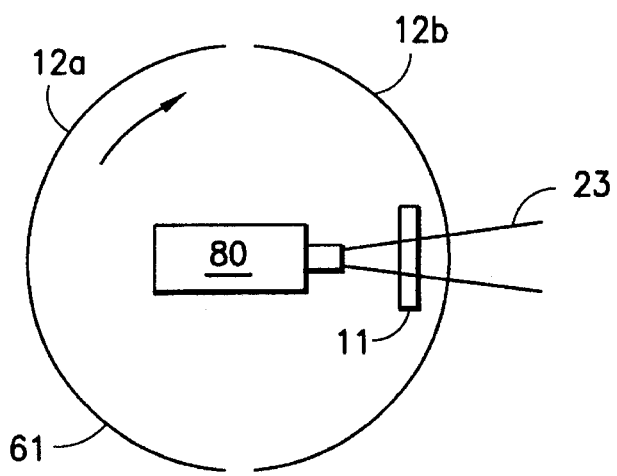
FIG. 10e is an alternate version of the receiver portion of the ice detection system using alternating quarter wave retarder plates.

A further alternative arrangement is to use a single linear polarization filter (or separate filters with their polarization axes aligned) in front of light sources 103 on assemblies 203a and 203b. FIG. 10e provides a detail of camera 80 surrounded by rectangular quarter wave retarder plate segments 12a and 12b bent into half-cylinders to form a barrel 61 that is rotated to alternate the two half-cylinder segments 12a and 12b to be in front of camera 80 when light source 13 is strobed. One quarter wave retarder plate segment 12a is arranged to accept circularly polarized light of one hand received in camera view angle 23 and convert it to linear polarization aligned to linear polarizer 11, thus allowing the light to pass to camera 80. The other quarter wave retarder plate segment 12b is arranged to accept the same light and convert it to linear polarization orthogonal to the polarization axis of linear polarizer 11, thus preventing the light from reaching camera 80.

Using the camera of FIG. 10e, all assemblies 203a and 203b of the light sources 13 are strobed simultaneously when camera 80 is ready to record an image. Barrel 61 is rotated to synchronize the positions of segments 12a and 12b to be present alternately for sequential images. Light sources 13 project circularly polarized light of one hand on a wing surface 15. Light reflected from specular portions of wing surface 15 will be circularly polarized and produce a blinking image in camera 80 as segments 12a and 12b alternately cause the reflected light to be passed or blocked respectively. Unpolarized reflected light from ice patches 16 will pass to camera 80 when either segment 12a or 12b is present and the images will not blink. Further, since the closely spaced light source assemblies 203a and 203b are strobed for both images, there is no angular shift in the light source that could alter the reflected light intensity. This produces less light intensity variation from specular surfaces that could tend to reduce the blinking effect.

Figure 10F:
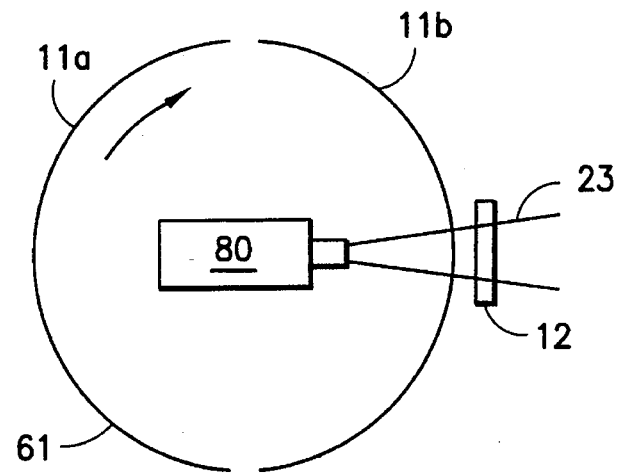
FIG. 10f is an alternate version of the receiver portion of the ice detection system using alternating linear polarizer plates.

A further alternate arrangement omits the quarter wave retarding plate windows 31a and 31b from light sources 13. FIG. 10f shows video camera 80 surrounded by rectangular linear polarizer segments 11a and 11b bent into half-cylinders to form a barrel 61 that is rotated to alternate the two segments previously described. Segment 11a is arranged to have its polarization axis aligned to the polarization received in camera view angle 23, reflected from wing surface 15. Segment 11b is arranged to have its polarization axis orthogonal to the same light.

Using the camera of FIG. 10f all assembles 203a and 203b of the light sources 13 are strobed simultaneously and produce linearly polarized light of one polarization when camera 80 is ready to record an image. Barrel 61 is rotated to synchronize the positions of segments 11a and 11b to be present alternately for sequential images. Light reflected from specular portions of wing surface 15 will be linearly polarized and produce a blinking image in camera 80 as segments 11a and 11b alternatively cause the reflected light to be passed or blocked respectively. Unpolarized reflected light from ice patches 16 will partially pass to camera 80 when either segment 11a or 11b is present and the images will not blink.

A further alternative retains the quarter wave retarding plate windows 31a and 31b of the light sources, and adds quarter wave retarder plate 12 shown in FIG. 10f. This produces circularly polarized light of one hand from light sources 13 for projection upon wing surface 15. Plate 12 then converts the circularly polarized light from specular portions of wing surface 15 to linearly polarized light aligned to the polarization axis of segment 11a and orthogonal to the polarization axis of segment 11b. Thus a blinking image will be produced for specular portions of wing surface 15, but not for iced patches 16 that reflect light that is substantially unpolarized.

Figure 11:
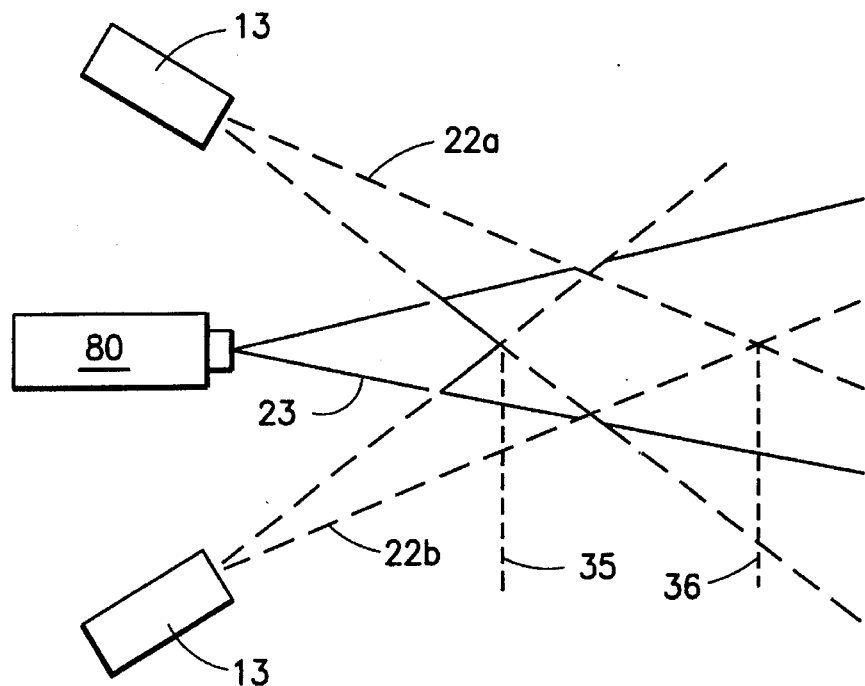
FIG. 11 schematically depicts the view coverage of the system.

FIG. 11 is a detail of the coverage of the ice detection system of FIGS. 10a–10f. Light beams in fans 22a and 22b from light sources 13 are aimed to illuminate surfaces at distances between points 35 and 36 from camera 80 and within camera view angle 23. This is done in both the vertical and horizontal planes.

Figure 12:
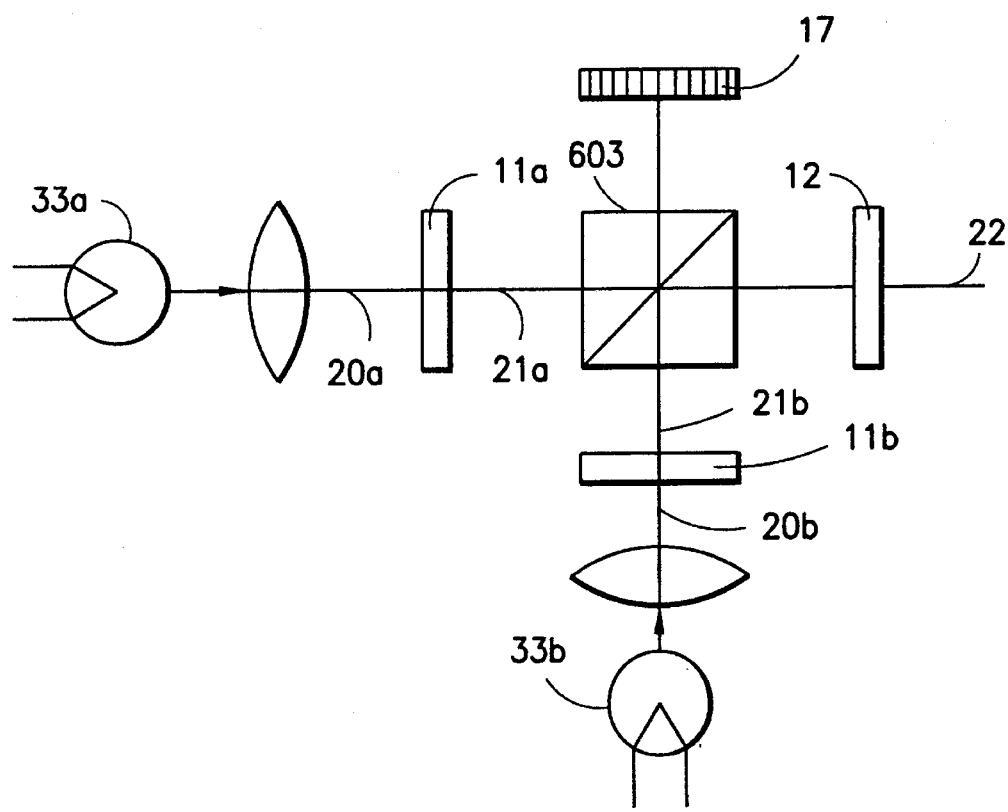
FIG. 12 is a schematic of an alternative light source producing coaxial beams for isolator and non-isolator states.

Another form of light source 13 of FIGS. 10a–10f is shown in FIG. 12. A lamp 33a, such as a flash lamp, has its light shaped into a beam 20a by optics. Beam 20a is linearly polarized by polarizer 11a forming linearly polarized beam 21a whose polarization is aligned to the polarization axis of polarizing beam combiner 603. Polarizing beam combiner 603 is a polarizing beam splitter such as Melles Griot 03PBS049 which is used in reverse to form a beam combiner. Beam 21a passes through beam combiner 603 and quarter wave retarder plate 12 to form circularly polarized beam 22. Likewise lamp 33b forms beam 20b, which passes through linear polarizer 11b forming linearly polarized beam 21b whose polarization is orthogonal to the polarization axis of beam combiner 603. Beam 21b is turned 90°, passes through plate 12 and can be aligned to coincide with beam 21a in beam 22. Since the two beams 21a, 21b coincide in beam 22, any angular offset effects of the light source are avoided as the lamps 33a and 33b are alternately strobed for reception by a camera 80 as shown in FIG. 10d. The principles of operation are as previously described, with lamp 33a of FIG. 12 replacing assembly 203a of FIG. 10c and lamp 53b replacing assembly 203b. Alternately, quarter wave plates 12 in FIG. 12 and FIG. 10d may be discarded to produce a system relying on linearly polarized light rather than circularly polarized light as previously described.

The linear polarizers 11a and 11b in FIG. 12 are not required if an absorber 17 is placed as shown to absorb the orthogonal polarized light of beam 21a, which will be reflected by beam combiner 603, and the aligned polarized light of beam 21b, which will pass through beam combiner 603.

The intensity of light reflected from a specular surface can vary by many orders of magnitude depending on the viewing angle. If camera 80 has an insufficient dynamic range, specular reflections of high intensity can cause saturation in portions of the image that can spread to adjacent areas providing a distorted image and may obscure the blinking effect, preventing the proper system operation.

One solution to the dynamic range problem is to first form the blocking/non-blocking image pairs with a normal level of light intensity and then with a lower level projected light intensity. The overall dynamic range of the system is thus increased by the amount (say 10:1) of the light reduction. If a greater dynamic range is required, a third image pair can be made at a further reduction. The overall dynamic range of the system is thus increased by the product of the reductions (say 10×10=100:1).

The reduction of the amount of light projected by light source 13 does not improve on the interference introduced by background light energy that may be within the field of view and adds to the image. A preferred method of increasing dynamic range, while at the same time reducing background interference, is to take several blocking/non-blocking image pairs where each pair is taken at a reduced camera sensitivity by reducing the aperture size or aperture time of camera 80 while keeping the projected light intensity constant from light source 13. Background interference can be further reduced by filtering the light received by camera 80 with a filter transparent to the wavelengths of light projected by light source 13 and blocking background light of other wavelengths. Because a sensor's response to light may be non-linear and the ratios desired are not necessarily constant, it may not be possible to merely subtract the observed value of background light. Rather, the background light and the non-isolator light may be used as an index (or indices) into a look-up table of predetermined values to serve as a threshold for determining if the isolator light level is an indication of the presence of ice. The method for automated processing is described below.

FIG. 3B shows another ice detection apparatus especially suitable for night use, which is based on direct visual observation and uses only one light source 13 with a circular polarizer 30, such as in FIG. 1A. In FIG. 3B the receiver telescope 50 has apparatus at its input for changing a circular polarizer between the isolating (FIG. 1A) and non-isolating (FIG. 1B) states. Here, the light source 13 and the telescope 50 are mounted on a support structure 52 of a boom mount or tripod 68. A power supply 67 for light source 13 also is mounted on the boom.

Power supply 67 supplies the power to light source 13 along cable 66b. Light source 13 incorporates a circular polarizer 30, such as that of FIG. 1A. The field illuminated by light source 13 is shown as fan 22a and encompasses an aircraft wing area 15 which has a patch of ice 16. Telescope 50 has a field of view encompassing the aircraft wing, or portion of the wing, and this is shown as the rays in field of view 23 which enter the telescope 50. Telescope 50 alternates between optical isolation and non-isolation to the reflected light using a circular polarizer made of a fixed linear polarizer 41 and quarter wave retarder plate 42a. As shown in FIG. 3C, the quarter wave retarder plate 42a is rotated about its optical axis by drive 65.

Referring also to FIG. 3C, the apparatus for rotating the quarter wave retarder plate 42a is shown. The quarter wave retarder plate is rim driven by friction drive 65 attached to a motor shaft 64 driven by a motor 63 which itself is attached to telescope housing 61. Bearings 62 between the quarter wave retarder plate 42a and the housing 61 relieve friction so that the quarter wave retarder plate 42a may freely rotate about its optical axis. When the quarter wave retarder plate 42a has rotated to such a position that its slow and fast axes are at 45° to the vertical, as shown in FIG. 2, the unit acts as an optical isolator and any circularly polarized light that is specularly reflected from the aircraft wing 15 cannot pass through the combination of the quarter wave retarder and the linear polarizer to the eye 26.

A similar end may be achieved by rotating the linear polarizer 41 via rim drive 60 and keeping the quarter wave retarder plate 42a fixed or by keeping both linear polarizer 41 and quarter wave retarder plate 42a fixed and rotating a half wave plate mounted between them with rim drive 60.

The position for optical isolation is achieved twice during two positions spaced 180° apart of each revolution of the quarter wave retarder 42a. At any other position of rotation of plate 42a, there is no isolation and the circularly polarized light reflected from the various portions of the wing, both metal and ice, is free to pass through to the eye with only minimal attenuation. Therefore, the specularly reflective metal portion of the wing that is not covered with ice will reflect light from the light source 13, circularly polarized, back through the isolating mechanism, linear polarizer 41 and quarter wave retarder plate 42a, and this specularly reflected light will be interrupted twice per revolution and blink off completely. During the other positions of the circular polarizer retarder plate 42a rotation the light will pass through to the eye 26. Thus, the "on"-"off" blinking effect will be produced twice for each rotation of plate 42a.

On the areas of the wing 15 when there is ice present, the incident circularly polarized light from light source 13 and polarizer 30 will be depolarized due to the surface of the ice or by passing through the ice. This depolarized light will pass through the isolator, liner polarizer 41 and quarter wave retarder plate 42a at the telescope 50 regardless of the rotational position of the quarter wave retarder plate 42a. That is, even when the plate 42a is in one of its two isolating positions relative to reflected polarized light, the non-polarized light reflected from the ice will pass through to the telescope as well as when the retarder plate is in a non-isolating position.

The eye 26, which is looking through the telescope 50, is able to differentiate between the blinking effect produced by the ice free section of the wing 15 and the non-blinking effect produced by patches 16 of the wing with ice. That is, the sections of the wing covered with ice 16 will appear to have constant illumination and the ice free sections of the wing will appear to blink at a rate of twice the speed of rotation of the quarter wave plate 42a.

In either of the embodiments of FIGS. 3A and 3B, the apparatus can be moved to scan all parts of the wing if the field of view is not large enough.

Figure 4A:
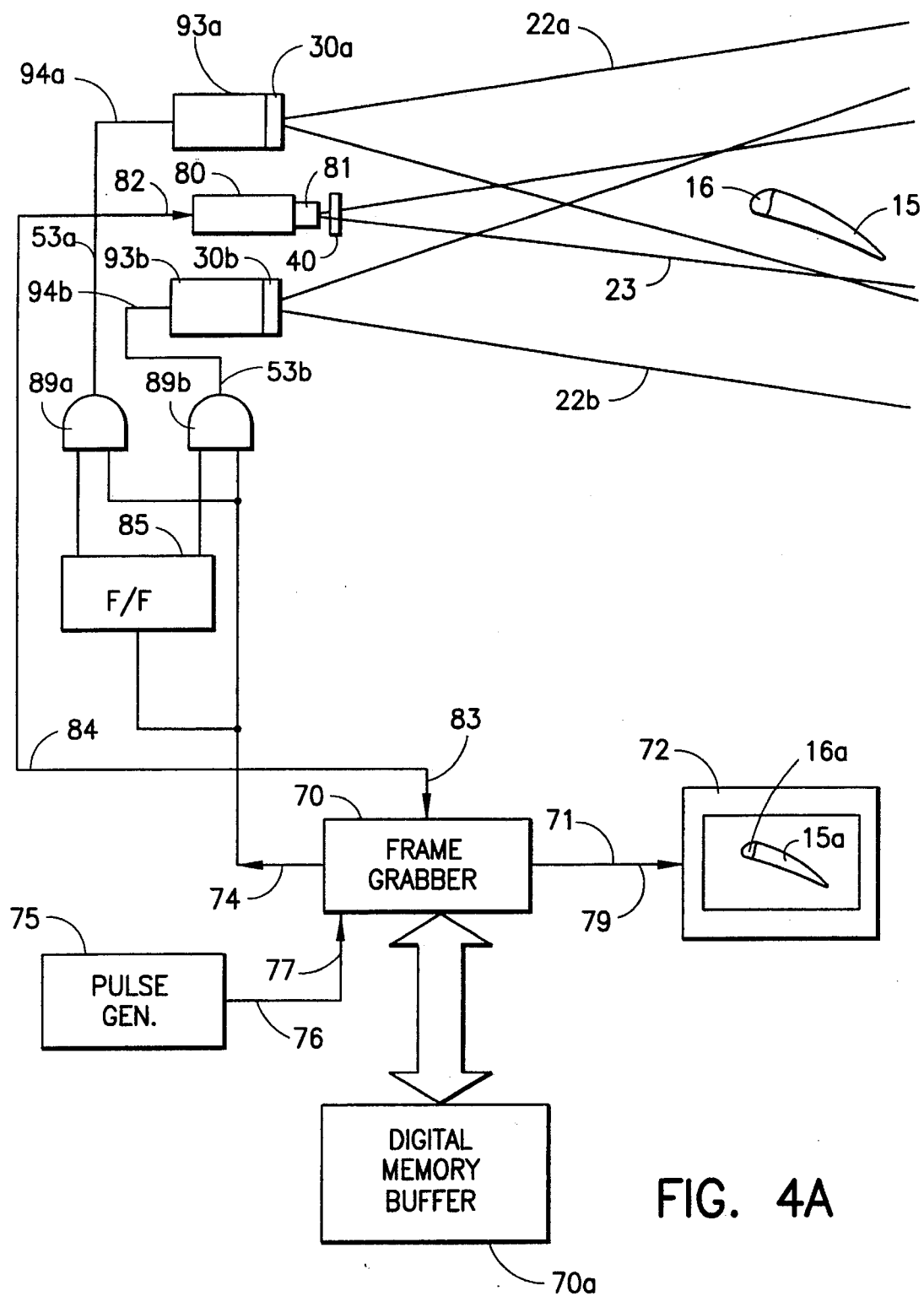
FIG. 4A is a schematic diagram of a video based ice detection system suitable for use with high background illumination levels which employs two strobed light sources.

FIG. 4A shows an indirect viewing video-based ice detecting system that employs two strobe lamp spotlights and is suitable for use with high background illumination levels.

The system of FIG. 4A is similar to that of FIG. 3A in that it employs two strobe lamps 93a, 93b. These lamps are of the type which produce a high intensity output, for example a xenon lamp, for a short time period. Here, both strobe lamps 93a and 93b have circular polarizers, such as in FIG. 1A, attached. One is a right handed circular polarizer 30a and the other a left handed circular polarizer 30b. The strobe lamps 93a and 93b are used in conjunction with a conventional video camera 80 with a lens 81 having a right handed circular polarizer 40 at its input.

The analog signals of the image produced by the video camera, which observes the scene illuminated by the strobe lamps 93a, 93b, are sent to a conventional frame grabber 70. The frame grabber 70 converts the analog video signal from camera 80 to digital form and stores the data in a digital memory buffer 70a. Pulse generator 75 is used to initiate the strobing of the lights and the grabbing of a single isolated frame by the frame grabber from the video camera.

The system also preferably has a digital to analog converter and sync generator so that the image stored in the buffer 70a can be sent from the frame grabber video output to a video monitor or VCR 72 along cable 71. The video monitor and the video cassette recorder (VCR) are commercially available. As an alternative, the video monitor may have a disk recorder which is also commercially available. The frame grabber may be purchased with additional memory attached and a computer as part of one single image processor unit. Frame grabber 70 and its memory, plus the computer, may be bought commercially as the Cognex 4400.

A flip flop 85 alternates between states on every strobe pulse produced by pulse generator 75. This allows selectively gating a strobe pulse to either lamp 93a or 93b so that they are illuminated alternately. When a pulse trigger input is received by the frame grabber 70 from pulse generator output 76, a camera synchronized strobe pulse is generated which is fed from the frame grabber output 74 to the flip flop 85. The strobe pulse toggles flip flop 85 and is also gated through one of two AND gates 89a and 89b. When the flip flop 85 is in one state the strobe out of the frame grabber is gated through AND gate 89a to the input 94a of strobe lamp 93a along wire 53a. When flip flop 85 is in its other state, a pulse is sent along wire 53b to input 94b of strobe lamp 93b. Thus, lamps 93a and 93b are alternately illuminated.

The field of view from the strobe lamp 93a with right hand circular polarizer 30a is shown as fan 22a. The illumination area from strobe lamp 93b with left handed circular polarizer 30b is shown as fan 22b. The video camera 80 has a field of view 23 that covers the overlapping region between fans 22a and 22b. In the video camera field of view 23 are the wing 15 with ice patch 16. The images that correspond to wing 15 and ice patch 16 that are shown on the video monitor 72 are labeled correspondingly as wing image 15a and ice image 16a.

During operation, the pulse generator 75 is set to provide trigger signals at a constant rate, e.g., in a range between 1 and 10 Hz. When a trigger signal enters the frame grabber input 77, it is synchronized with the frame grabber internal cycle and at the proper time the frame grabber provides a strobe to flip flop 85 which is passed on to strobe lamps 93a or 93b. The strobe output is timed to be properly aligned with the frame synchronization signal that is sent along cable 84 as frame grabber output 82 into the video camera 80. Cable 84 provides a path from the frame grabber 70 to the video camera 80 for synchronization and a return path for video camera output 83 to the frame grabber for the video signal.

If the pulse received by the AND gate 89a is enabled because flip flop output 85 is high, the strobe will pass through AND gate 89a, enter the strobe input 94a and fire the strobe lamp 93a. The strobe lamp will produce a very short light pulse of approximately 10 microseconds length. The light pulse from the strobe lamp 93a illuminates the wing area. The reflected light from any ice free specular area of the wing will be left hand circularly polarized because of the right hand circular polarizer 30a at the output of strobe lamp 93a. Because the video camera 80 has a right hand circular polarizer 40 at its input, it acts as part of an isolator. That is, any reflection from a clean metal specular area of the wing will reflect left hand polarized light which will not be able to get through the right hand circular polarizer 40 of the camera 80 and thus these areas as viewed by the camera will be very dark. The image sent by the video camera to the frame grabber will also appear very dark as well as the stored image that is sent from the frame grabber buffer memory into the video monitor input 79 via wire 71.

Where there is ice present on the wing it will spoil the circular polarization of the polarized incident light and the image scene of the reflective light picked up by camera 80 and viewed on monitor 72 will not be dimmed.

When the strobe signal passes through AND gate 89a, it simultaneously resets flip flop 85 to the opposite state such that AND gate 89b is enabled. Therefore, the next pulse from the pulse generator 75 into the frame grabber 70 causes the corresponding strobe pulse to be generated which will be gated through AND gate 89b to energize strobe lamp 93b whose light output is left hand polarized. Energy from strobe lamp 93b that strikes the wing 15 and returns from clean metal will be sent into the right hand polarizer 40 of the video camera 80. However, in this case, because the polarizations are of opposite hand, the reflected light energy that enters from specular reflecting portions of the wing 15 will pass through right hand polarizer 40 and into video camera 80 via lens 81 with only minor attenuation. That is, light from the left handed circularly polarized source 93b, 30b is changed to right handed circular polarization upon specular reflection from wing 15 and this light may pass freely through the video camera's right hand circular polarizer 40.

The corresponding analog signal from the video camera that is sent to the frame grabber 70 is recorded in its frame memory buffer and is output along line 71 to the video monitor 72. This particular signal will create an image that has little difference in light intensity between a specular area or an ice covered area. polarization in this case is not important since the specularly reflected left handed circularly polarized light will pass through the video camera's right handed polarized filter 40. Thus, specular reflected returns and also the returns that come from paint or ice covered surfaces will pass equally well. Accordingly, the blinking effect will be produced for the area of a metallic surface which does not have ice on it.

Video camera 80 is preferably of the type with a built-in electronic shutter such as the Hitachi KP-M1. Because the camera shutter can be set for a very brief time interval that corresponds to the time interval of the strobe lamp illumination, the camera will be especially sensitive to the bright light from the strobe lamps and very insensitive to background light which will not be at a peak during the brief open shutter interval and will ignore all background light outside of the interval that the shutter is open.

Figure 4B:
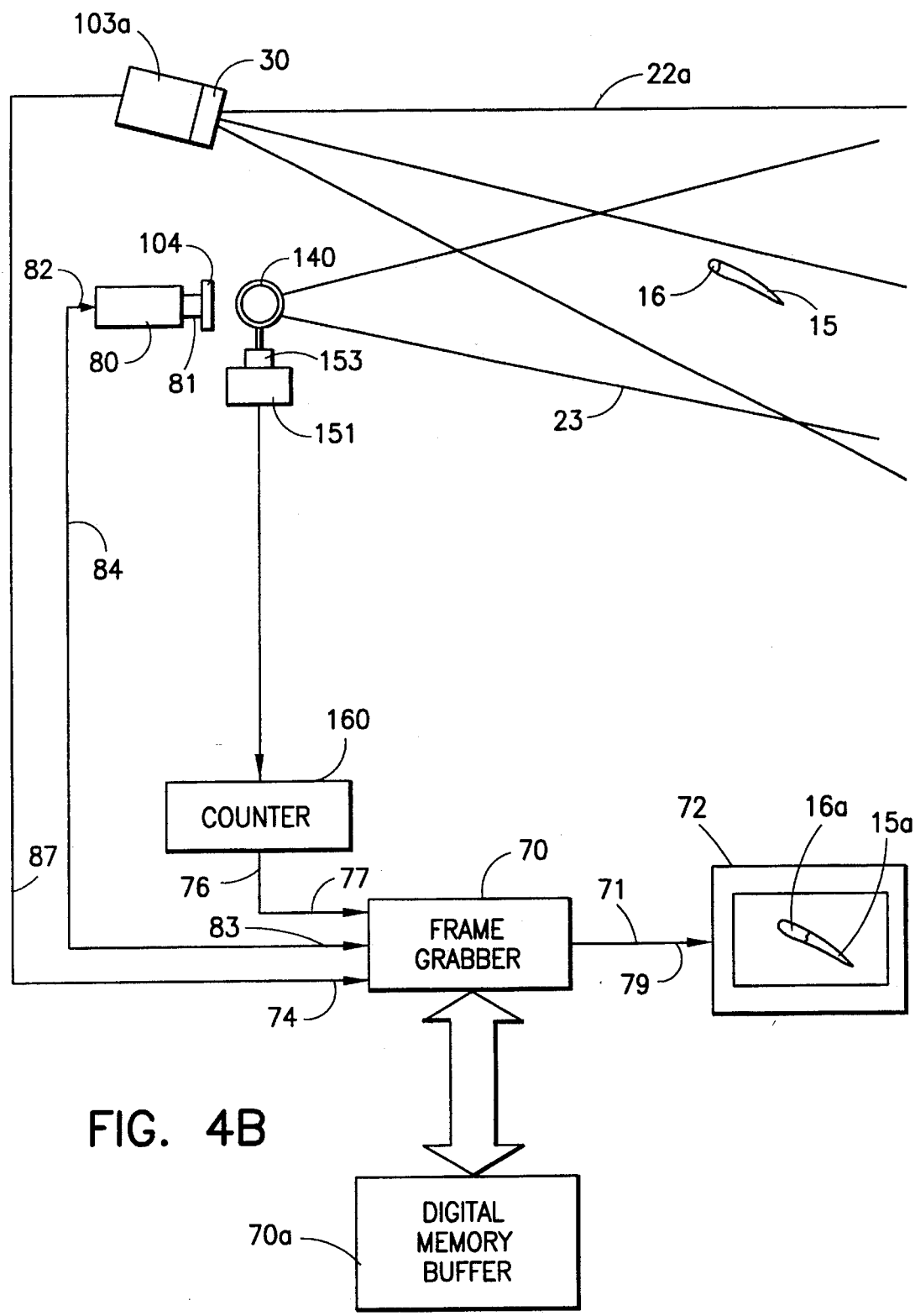
FIG. 4B is a schematic diagram of a video based ice detecting system employing one laser based strobed light source suitable for use with high background illumination levels.

FIG. 4B shows an indirectly viewed video based ice detecting system employing one strobed laser spotlight that makes it suitable for use with high background illumination levels. In FIG. 4B a strobe lamp 103a is a pulsed laser which typically has an output at a wavelength in the region of about 800 nanometers. Light from laser strobe lamp 103a is sent through a right hand circular polarizer 30 and covers the field of view in fan 22a. The light from a laser is often naturally linearly polarized without using a linear polarizer and in such a case it may be circularly polarized by just incorporating a properly oriented quarter wave retarder plate in right hand circular polarizer 30. The right hand polarizer 30 if it includes a linear polarizer, must be rotated to the proper position so that its self-contained linear polarizer is in line with the polarization of the laser lamp output in the case that the laser light is naturally linearly polarized.

Video camera 80 views the scene via a narrow band interference filter 104 which is centered about the strobe lamp 103a output wavelength. Generally, such a filter will have a bandpass of approximately 10 nanometers and reject all light outside of the bandpass wavelength.

Reflected polarized light from the specular reflecting part of wing 15 entering the video camera 80 also passes through a rotating right hand circular polarizer 140 placed in front of the video camera lens 81. The rotating right hand polarizer 140 is driven by a motor 151. A signal from an encoder 153 attached to the motor 151 is sent only when the rotating right hand circular polarizer 140 has its plane parallel to the lens 81 at the video camera input so that the optical axes of such lens and of the polarizer are in alignment.

The analog video signal from the video camera is sent to frame grabber input 83 via cable 84 and on the same cable the frame grabber synchronizing outputs are sent to the video camera in-put 82. A monitor plus VCR (optional) 72 is connected to the frame grabber video output via cable 71. The image of the wing 15a and the image of ice area 16a on monitor 72 correspond to wing 15 and ice area 16 which are in the field of view of both the fan 22a from laser strobe lamp 103a and camera field of view 23.

In the operation of polarizer 140, synchronous motor 151 rotates the right hand circular polarizer 140 in front of the video camera 80 at a high rate of approximately 600 RPM. The plane of the right handed circular polarizer 40 lines up with the lens plane of the video camera lens 81 twice per revolution. Thus, there are 1200 times per minute that a picture may be taken. The output from encoder 153 on the rotating shaft of polarizer 140 is used to identify each time that the rotating polarizer passes through such an aligned position. The two positions per rotation are alternately isolating and non-isolating and correspond to the FIG. 1A and FIG. 1B illustrations of the isolating and non-isolating modes achieved by turning one of the circular polarizers.

The synchronizing pulses from the shaft encoder are sent to a programmable binary counter 160 which can be set to divide by any desired number. The output pulses from the binary counter are sent to the trigger input 77 of the frame grabber 70 along wire 76. A typical counter divides by any integer between 1 and 16. Counter 160 allows the rate at which pictures are taken to be adjusted from a very rapid rate to a slow rate. For example, the rate at which pictures will be taken when the divider is set to 16 will be 1200 pictures per minute divided by 16. To insure that alternating isolating and non-isolating states are obtained it is necessary to use only odd numbers as the divisor.

In both cases of FIGS. 4A and 4B electronic circuits are preferably used to gate the video camera 80 to accept light only during the active interval of the strobe light. Also, in both cases optical bandpass filters may be used in front of the camera to match the strobe lamp's peak wavelength while simultaneously blocking out most of the wavelengths associated with ambient lighting. The typical strobe light, a xenon flash tube, produces a 10 microsecond flash which may be synchronized to the 1/10,000 second shutter of a commercial CCD video camera. Since the unshuttered camera would normally integrate ambient light for at least one field, or 16 milliseconds, there is an improvement factor of 160:1, i.e., the effect of ambient sunlight can be reduced by 160:1. This 160:1 factor can be further improved by matching the strobe lamp (or pulse laser source) with a filter that cuts down the ambient wide band light by a much greater amount than the illumination source.

In both the systems of FIGS. 4A and 4B the video from the video camera is captured in a frame grabber and displayed on a video monitor. Thus, if the system alternates between the isolator and non-isolator state at a 2.22 Hz rate (division=9) the picture on the monitor will be updated every 0.45 second and the human observer watching the monitor will see the ice free metallic surfaces blink between dark and bright at the 2.22 Hz rate.

The embodiment of FIGS. 4A and 4B effectively add an image processing computer which performs arithmetic operations on individual pixels in multiple frame stores with one frame store per captured picture. The ability to perform operations on pixels allows working with portions of the image that are of low intensity and also provides further means for eliminating the deleterious effects of undesirable background illumination such as sunlight.

Even if a curved aircraft surface region is illuminated by multiple illumination sources of circularly polarized light, it will be found that due to the varied orientations of the surface normal with respect to the illumination sources and receiver there will be bright regions and dim regions in the image of the aircraft surface. The bright regions will correspond to those areas where the surface normal has the proper orientation to directly reflect the light from at least one of the illumination sources into the camera lens. The dim regions correspond to those areas of the aircraft surface where the surface normal is such that the light from the illuminators is reflected predominantly away from the camera lens. As previously described, portions of the image that correspond to an ice free surface and are brightly lit will tend to vary between white and black in successive pictures on the monitors of the FIG. 4A and 4B apparatus. However, portions of the aircraft surface that are ice free but in a dim region will vary between very dark gray and black in successive pictures and so may be difficult to identify. This problem will exist both because of the limited dynamic range of the monitor and camera and because the ratio of dark to light is intrinsically less for off-axis returns. Any remaining background due to sunlight further reduces the apparent brightness ratio between ice free regions of successive images, particularly in the dim regions, by adding unwanted illumination to the images taken in both the isolating and non-isolating mode.

An optimum use of the equipment of FIG. 4A and 4B is to first capture an image in the frame store that corresponds to strobing the illuminator but blocking the light from specular reflection from ice free metal; e.g., capture a picture in the isolator mode. Next, the illuminator is strobed and a picture is captured in the non-isolating mode. Finally, a picture is captured with the illuminator strobe off, capturing a picture that consists purely of the undesirable background light. If the receiver (detector) optics is being varied between pictures to change between the isolating and non-isolating mode of operation, it is not important which mode it is in when the background image is captured because both modes will have been balanced for equal light attenuation of unpolarized light.

The digital value corresponding to the background illumination in each pixel of the frame grabber holding the background may now be subtracted from each corresponding value in each of the pixels of the image in which specular returns were blocked; i.e., from each pixel of the image taken in the isolating mode. The process of subtracting the background is repeated for each pixel in the frame grabber holding the image taken in the non-isolating mode. At this point, assuming linearity of the pixel values, the effect of any remaining background light has been removed from the two frame stores. If the recording or digitizing process is not completely linear the non-linearity must be removed before performing the subtraction. This is normally performed at the time the image is first digitized and entered into the frame store via the use of a look up table in the image processor and is well known in the state of the art.

Once the images in the frame grabbers have had the effects of background illumination removed, the image processor can find the ratio of amplitudes between corresponding pixels in the two images. By forming a ratio of the value of the intensity of the pixels in the second (non-isolating) image divided by the value of the intensity of the corresponding pixels in the first (isolating) image, a ratio having values generally equal to one or greater than one will be obtained. Ice free metallic surfaces that have surface normals reflecting the illumination towards the camera lens will have the highest ratios. A normalizing value approximately equal to one divided by the Nth root of one divided by the largest of the two pixel values that created the ratio (generally, the value of the pixel from the non-isolating picture) may be used as a multiplier to enhance the ratio from the ice free surfaces that are dim due to their being off-axis with respect to directing the reflected light towards the camera. N is typically an integer equal to or greater than 2. Of course, only values higher than some chosen threshold should be so normalized so that the system does not respond to noisy signals. If desired, the preceding arithmetic manipulation of pixel values may instead be performed on groups of pixels that correspond to segmented or filtered portions of the aircraft surface image. These filtering techniques which include low pass spatial filtering and median filtering may be used to operate on noisy images and are well known in the state of the art. Another suitable metric for comparing corresponding isolating and non-isolating pixel or region brightness amplitudes is the normalized difference. This may be formed by subtracting corresponding pixel or region amplitudes and dividing the result by the sum of their amplitudes.

To highlight ice free regions in the most easily interpreted form, the ratios may be assigned to colors as, for example, that high ratio regions are assigned to the color green, low ratio regions to the color red, and intermediate ratio regions to the color yellow. These colors may be used to color the non-isolator image on the screen of the color video monitor. Optionally, the ratios may be encoded in black to white intensity levels that may be displayed in the same manner as the color encoded images. Such levels may be used to indicate ice thickness according to the amount of depolarization observed.

All of the preceding techniques of using isolator and non-isolator structures may be implemented by using linearly polarized light in the illuminator, rather than circularly polarized light, and equipping the receiver (detector) with a linear polarizer that is alternately aligned with and then at right angles to the polarizer in the illuminator. This mode of operation depends upon the fact that an ice-free metallic surface will return polarized light approximately unchanged whereas an ice covered metal surface or matte material will de-polarize the light. Thus, once again, an ice covered metallic surface will remain at approximately the same intensity. Of course, the transmitted linear polarization can be alternated between being aligned with and then being at right angles to the direction of a linear polarizer in the receiver to achieve the same end.

Figure 5A:
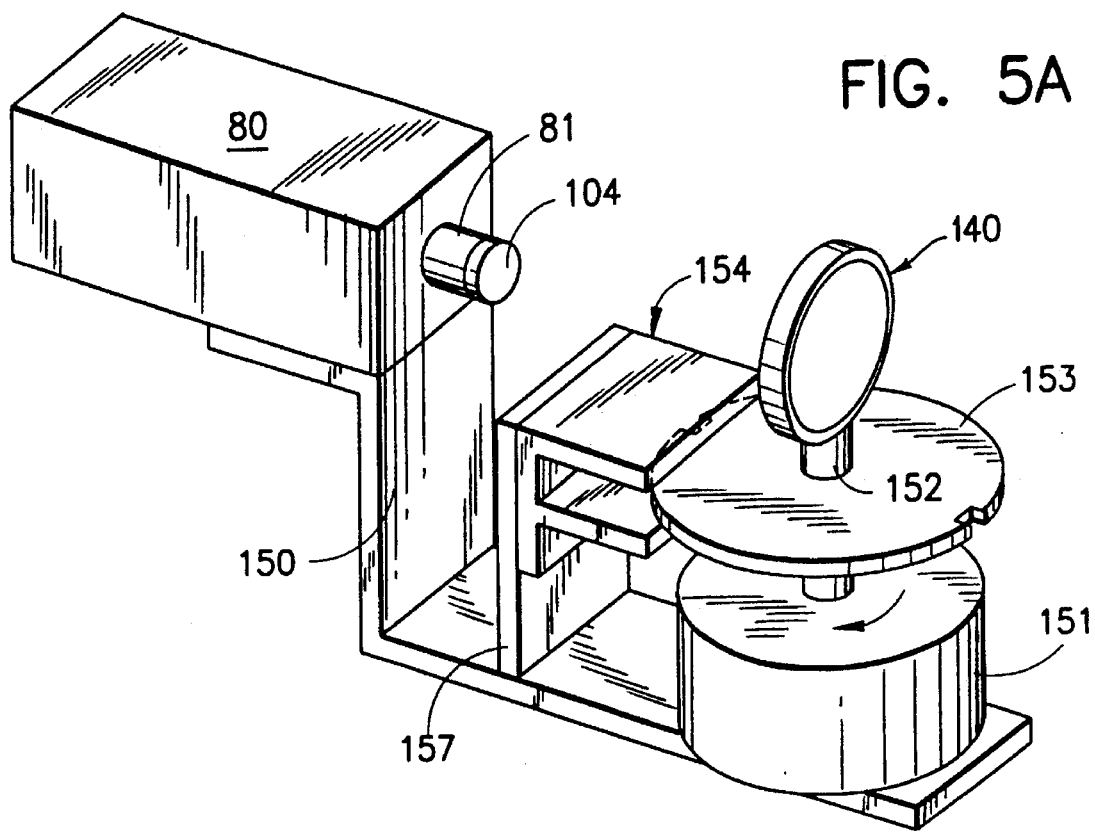
FIG. 5A is a schematic view of the device used in FIG. 4B to switch the polarizer from an isolating to a non-isolating state in the detection path.

FIG. 5A shows the details of the FIG. 4B rotating circular polarizer 140 and video camera 80 assembly. Video camera 80 is mounted to a bracket 150. A motor 151 is also mounted to bracket 150 and has a slotted output shaft 152 for holding the circular polarizer 140 to rotate in synchronism with the shaft. An encoder disk 153 mounted on shaft 152 is used to sense the position of the rotating polarizer 140. Encoder disk 153 has a photo optical interrupter 154 supported by a member 157 affixed to bracket 150. The encoder disk is solid everywhere except for two positions, 180° opposite each other, which are in line with photo interrupter 154 only when the optical plane of polarizer 140 is parallel to that of the lenses in video camera lens assembly 81.

Figure 5B:
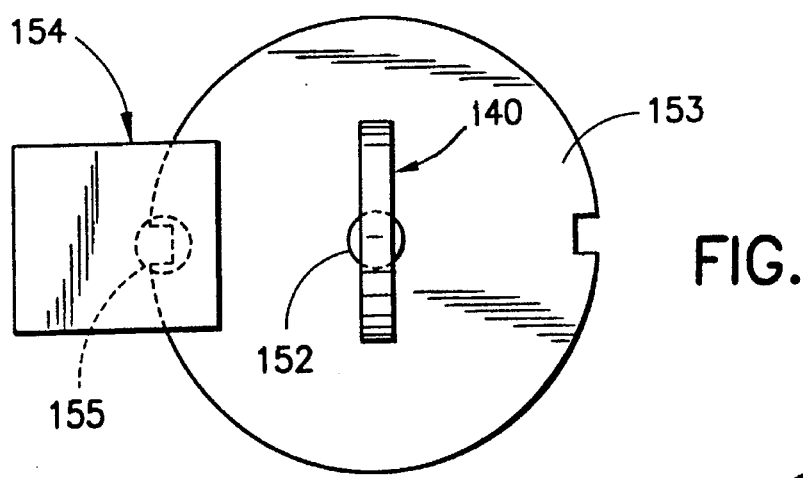
FIG. 5B is a plan view of the motor, polarizer and encoder assembly used with the apparatus of FIG. 5A.
Figure 5C:
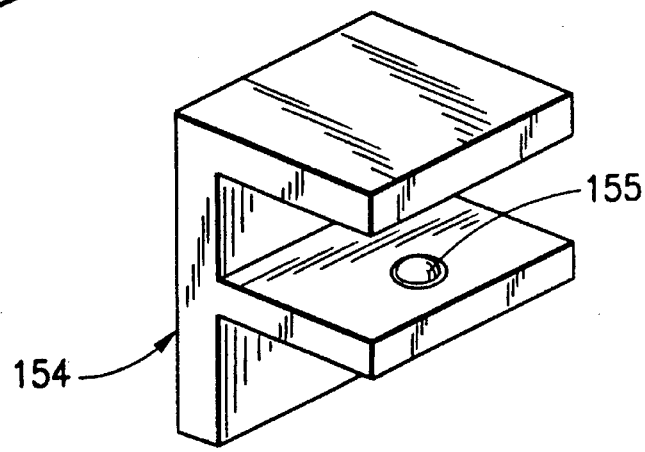
FIG. 5C is a schematic view of the photo interrupter device used in the encoder assembly of FIG. 5B.

A top view of this arrangement is shown in FIG. 5B and FIG. 5C which shows an encoder pickup 154 which incorporates an LED light source and a photo diode in one package 155 that is commercially available as Optek part number OPB120A6.

Figure 6:
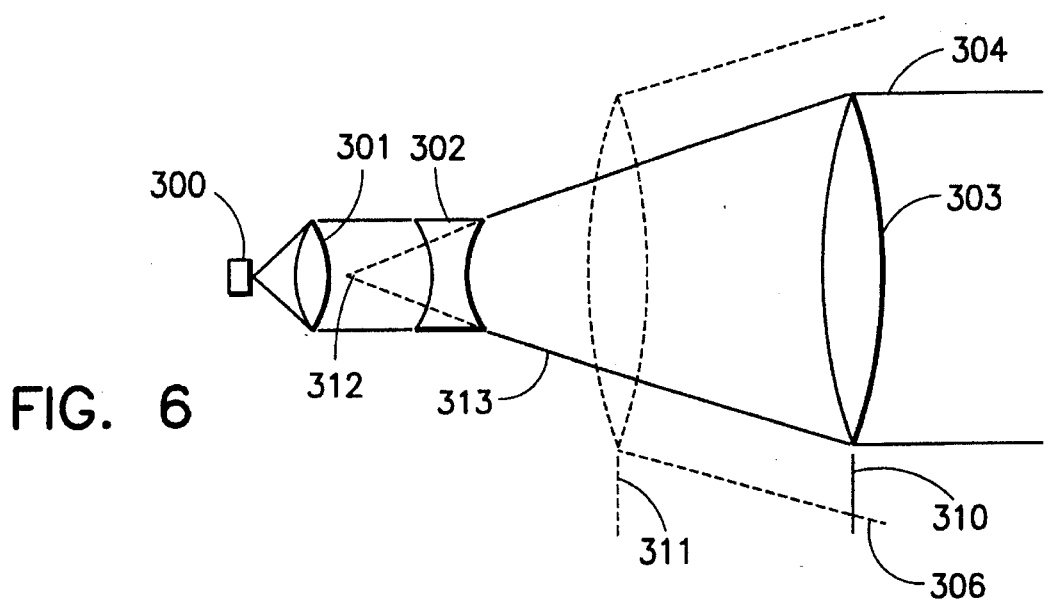
FIG. 6 is an optical schematic diagram of the laser light source of the system of FIG. 4B.

FIG. 6 is an optical schematic of the laser diode spotlight assembly. Light from laser diode 300 is collected by a collimating lens 301 and the collimated beam is sent into the telescope formed by a negative lens 302 and a positive lens 303. When the focal point of the positive lens is coincident with that of the negative lens, a collimated beam emerges from the positive lens 303. Positive lens 303 is shown in position 310 so that its focal point coincides at 312 with that of negative lens 302. A collimated beam 304 is the result of this configuration. When the positive lens 303 is moved closer to the negative lens, such as to position 311 in FIG. 6, the beam 306 that emerges is expanding and so can cover a wider field of view. Thus, by adjusting the position of the lens from 310 to a point where it is close to the negative lens, it is possible to obtain any output light cone between collimation and a cone slightly narrower in angle than that of the beam 313 as it leaves negative lens 302. The arrangement of FIG. 6 is also applicable to all other illumination sources shown when the source (filament or flash lamp) is small.

Figure 7:
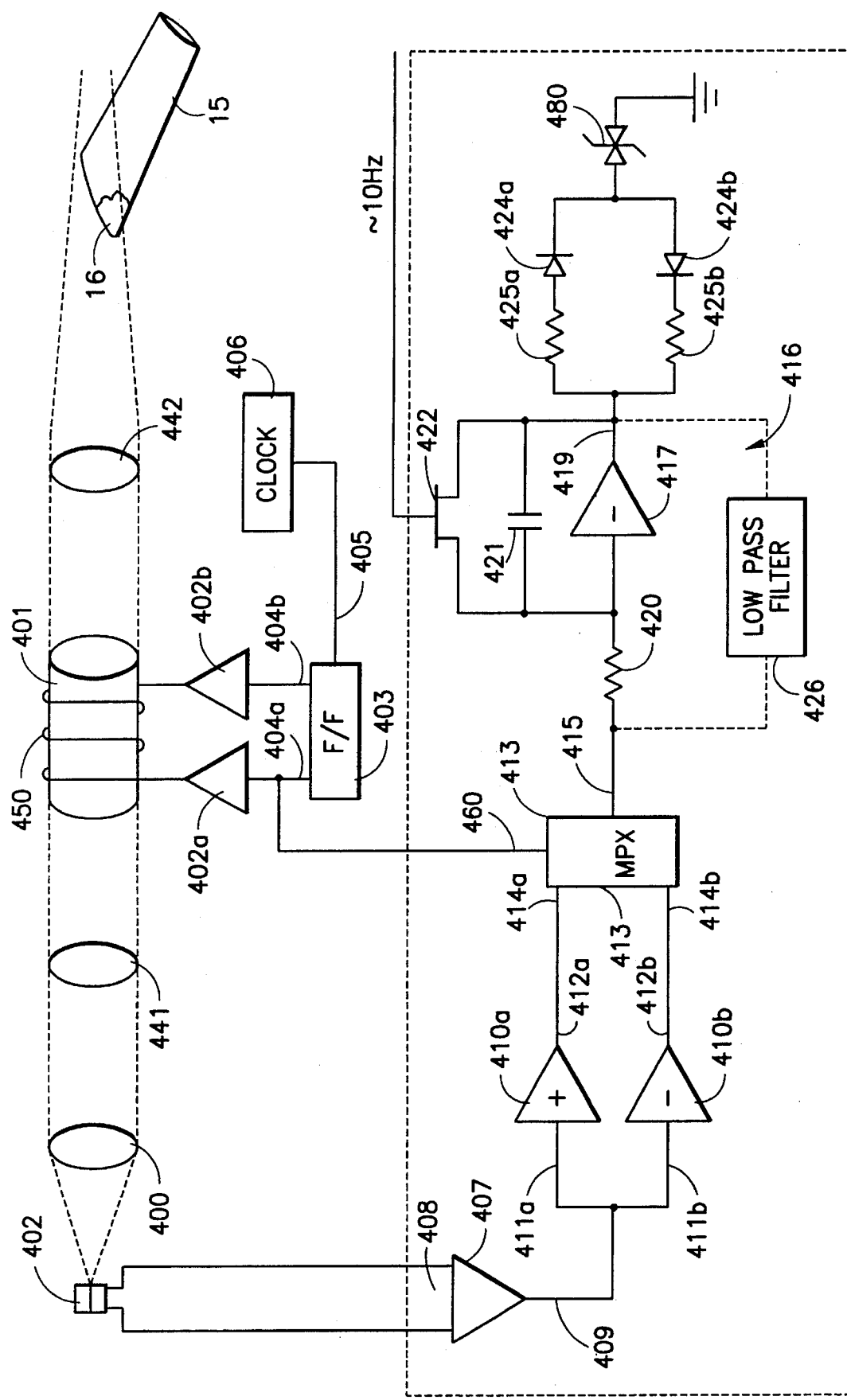
FIG. 7 is a schematic of another embodiment of the invention which utilizes synchronous detection.

FIG. 7 shows an indirect viewing system for ice on metal detection that uses a synchronous detection method that can operate with one photosensor or an array of photosensors, according to the field of view and resolution required. The illumination source for the surface area 15 to be inspected is not shown but it may be any bright source of either right handed or left handed circularly polarized light.

The area that is to be inspected is imaged via camera lens 400 onto photodiode 402, or onto an array of similar photo diodes. The circular polarizer required for isolation is formed by quarter wave retarder plate 442, linear polarizer 441 and Verdet rotator 401. The Verdet rotator is typically of garnet and energized by a magnetic field created by a coil 450 via power buffer amplifiers 402a and 402b which alternately drives current through the solenoid, first in one direction and then in the other. The effect is to cause linearly polarized light from the quarter wave plate passing through the rotator to change the direction of its polarization by plus or minus 45° according to the direction of the solenoid current flow. Other devices based on the Hall and/or Pockel's effect which use high voltage fields could be used in a similar manner.

In the static condition with no current flow through the coil 450, both right handed and left handed reflected circularly polarized light from wing area 15 will pass through the polarizer 441 to the photo diode 402 with little attenuation because the slow axis of quarter wave plate 442 is in line with the polarization axis of linear polarizer 441. Therefore, light of either hand circular polarization is at 45° to the polarizer and so can pass through polarizer 441 without large attenuation. However, when the coil is alternately energized with current flow in opposite directions, the addition and subtraction of 45° to the plane of polarization present at the output of the quarter wave plate 442 causes the plane of polarization to alternate between vertical and horizontal at linear polarizer 441. Thus, reflected circularly polarized input light will alternately be allowed to pass and not pass to the photo diode detector.

Because the rotation of the plane of polarization is performed via current direction switching, it can be performed quite rapidly. A 10 KHz rate, which is adequate for the apparatus, is easily obtained. A clock source 406 provides pulses to a flip flop 403 at its toggle input 405. The flip flop 403 outputs 404a and 404b are amplified by buffers 402a and 402b to energize coil 450 in a direction that varies according to the state of the flip flop 402.

The optical energy received at the photo diode array 402 generates a corresponding electrical signal that is applied over input line 408 to a differential amplifier 407. The output 409 of amplifier 407 feeds two buffer amplifiers 410a and 410b via their inputs 411a and 411b. Both amplifiers 410a and 410b have equal gain but are of opposite polarity.

A multiplexer 413 has its inputs 414a and 414b connected to the two amplifier 410a and 410b outputs 412a and 412b. The multiplexer 413 directs its two inputs to its single output 415 according to the state of its select terminal 460 which is connected to output 404a of the flip flop 403. The output 415 of the multiplexer 413 is applied to an integrator 416 or optional low pass filter 426. The integrator 416 is formed by input resistor 420, operational amplifier 417, capacitor 421 and field effect transistor 422 which is used to periodically reset the integrator by discharging the capacitor. This arrangement is well known in the art. The integrator 416 (or filter 426) output 419, when greater than a threshold voltage positive or negative as set by a double end zener diode 480 and current source resistors 425a and 425b, will energize one of the oppositely poled LED's 424a or 424b.

The detection circuit of FIG. 7 rejects the light reflected from diffuse or ice covered areas but passes that from ice-free specular surfaces. Diffuse or ice covered surfaces return unpolarized light to the detector. With these type surfaces, although the current direction in the Verdet rotator 401 is changing direction at a 10 KHz rate, the light received by the photo diode 402 remains at a constant level, i.e., the light amplitude is unchanged because the light is not polarized.

The electrical voltage at the output 409 of amplifier 407 responds to the input level and remains constant. The multiplexer 413 alternately selects equal constant level positive and negative voltages so that the integrator 416 (or low pass filter 426) output 419 stays close to zero and neither of the LED's 424a or 424b draw current since the output voltage does not overcome the zener diode 480 threshold voltage.

It can be seen that when area 15 is ice free the light returned to the apparatus will be circularly polarized and the signal at photo diode 402 will alternate between a large and small value at a 10 KHz rate. Since the two voltages selected at terminals 414a and 414b will differ in amplitude, they will not average to zero at the output of the integrator 416 (or low pass filter 426) and one of the LED's will light, according to whether the larger of the two voltages at point 409 was received when the state of flip flop 403's output 404a was high or low. This, in turn usually depends upon whether a right handed or left handed illuminator is being used. The output LED can also change if the wing area 15 being observed receives most of its circularly polarized illumination indirectly via specular reflection from another surface, since each such reflection changes the state (hand) of the circular polarization.

The apparatus of FIG. 7, when used with a single photodetector, is useful with a mechanical drive apparatus that scans the optical axis of the assembly in both elevation and azimuth to generate a raster scan which will create a full image of a scene on a point by point basis. The output 419 may be sent to a video display which is being scanned via its deflection circuits in synchronism with the mechanical drive apparatus to paint the image on the screen. As an alternative, the optical axis may be scanned in a raster pattern using azimuth and elevation deflecting galvanometer arrangements such as are available from General Scanning Corporation. Of course, such synthetically generated images may also be digitized and processed using the image processing hardware and software techniques previously described.

Figure 8A:
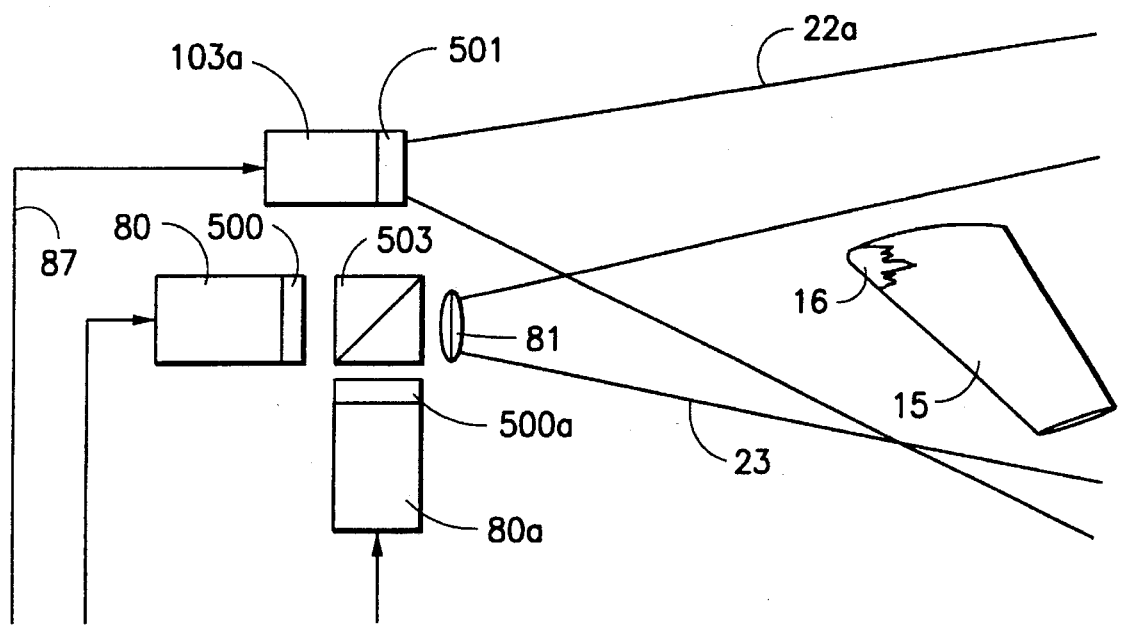
FIG. 8A is a schematic view of an embodiment which uses two video cameras and a beam splitter device.

FIG. 8A shows an embodiment of the invention useful when it is important to obtain ice detection information in an extremely rapid mode that is useful for scanning across an object in a short time without the smearing or the misregistration that may occur when the camera is panning and sequential pictures are taken for the isolating and non-isolating modes.

In FIG. 8A, a strobe lamp 103a is used with linear polarizer 501 to illuminate the wing surface 15 via polarized light in fan 22a. The video camera 80 with lens 81 images the scene as contained in field of view 23 which overlaps fan 22a. A polarization preserving beam splitter 503 is used to divide the energy received by lens 81 into two substantially equal amounts which are directed to video cameras 80 and 80a. Camera 80 is fitted with linear polarizer 500 which is in alignment with linear polarizer 501 so that reflected specular energy may pass with little loss and so creates a non-isolating mode receiver Camera 80a also is fitted with a linear polarizer 500a but its axis is aligned at 90 degrees to that of linear polarizer 501 so that reflected specular energy is blocked which creates an isolating mode receiver.

When the synchronizing pulse is received via wire 87, the strobe lamp 103a flashes for a brief time; 10 microseconds is typical. During the brief flash interval the isolating and non-isolating images are captured on the silicon CCD devices (typical) in the two cameras, 80a and 80, respectively. The two images can be read out sequentially via a multiplexer and recorded in the digital frame buffers of the image processor. A multiplexer of the type required is built into the Cognex 4400 and is normally part of most commercial frame grabbers and image processors. The processing of the images is substantially the same as previously described with amplitude comparisons being made between corresponding pixels or corresponding regions.

Because the two cameras use a common lens 81 the images will have top and bottom reversed (one is viewed through a mirror) but are otherwise substantially geometrically identical. Calibration may be obtained by recording any two points in the field of view and mechanically adjusting the CCD chips via translation and rotation to have a one to one correspondence of pixels. This can also be accomplished via software within the image processor and such conventional software as is normally furnished with the image processor. Because the lens 81 and cameras 80 and 80*a* are held in alignment, the calibration, whether via mechanical or software means, need only be performed once, at the factory.

In FIG. 8A, the linear polarizers may be replaced with circular polarizers such that at least one of the circular polarizers in the receiver has the same "hand" as that of the transmitter to provide an isolating mode image and the other has the opposite "hand" or not be circularly polarizing and have suitable attenuation to ensure that diffuse objects have the same intensity in both pictures. Additionally, if polarizing beam splitters are used, one or more of the polarizers in the receivers may be omitted since polarizing beam splitters will divide energy according to polarization properties.

In FIG. 8A, the isolating and non-isolating images may be obtained with two separate cameras as shown, but with two separate and substantially matched (in focal length and axis parallelism) lens means, one per camera, that create geometrically corresponding images. The correspondence need not be exact if corresponding image features or regions or pixel groups are compared with respect to average amplitude in the isolating and non-isolating mode.

Figure 8B:
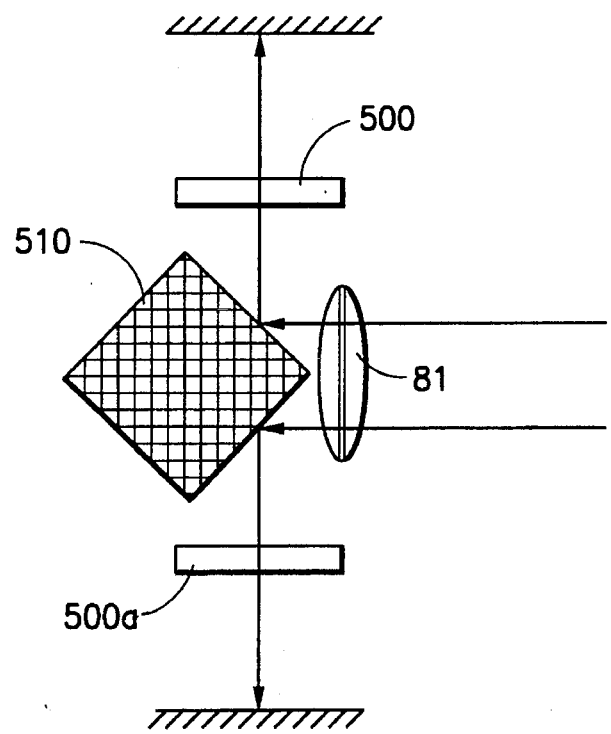
FIG. 8B is a schematic view of the optical path of FIG. A using two mirrors to replace the beam splitter device of FIG. 8A.

An alternative arrangement shown in FIG. 8B, section view, uses a mirror 510 in each path and so does not invert one image with respect to the other.

As can be appreciated, the camera in all embodiments may be replaced with a multiplicity of cameras at various positions and angles to the illuminated surface to gather more of the specularly reflected light and similarly, a multiplicity of illuminators may be used at various positions and angles to the illuminated surface to assist the cameras in gathering more of the specularly reflected light. It is only necessary that when such arrangements are used that all control signals and polarizers be common to the group of cameras that replaces one camera or to the group of illuminators that replaces one illuminator.

The arrangements of FIG. 8A and FIG. 8B require multiple cameras and beam splitters which are similar to first generation color cameras which employed three separate cameras to separately record three separate images, one for each of the primary colors. More modern color cameras employ a single camera with a patterned color filter that is organized in closely spaced columns; e.g., R,G,B,R,G,B,R, G,B . . . where R represents red, G represents green and B represents blue. This has the advantage of using only one camera plus simple electronics and requires a one time adjustment of the filter to the camera chip at the factory. The same identical color camera pickup chip and electronics circuits may be used to manufacture a polarization sensitive camera by replacing the tricolor filter used in the color camera with the two layer filter shown in the assembly of FIG. 9A.

Figure 9A:
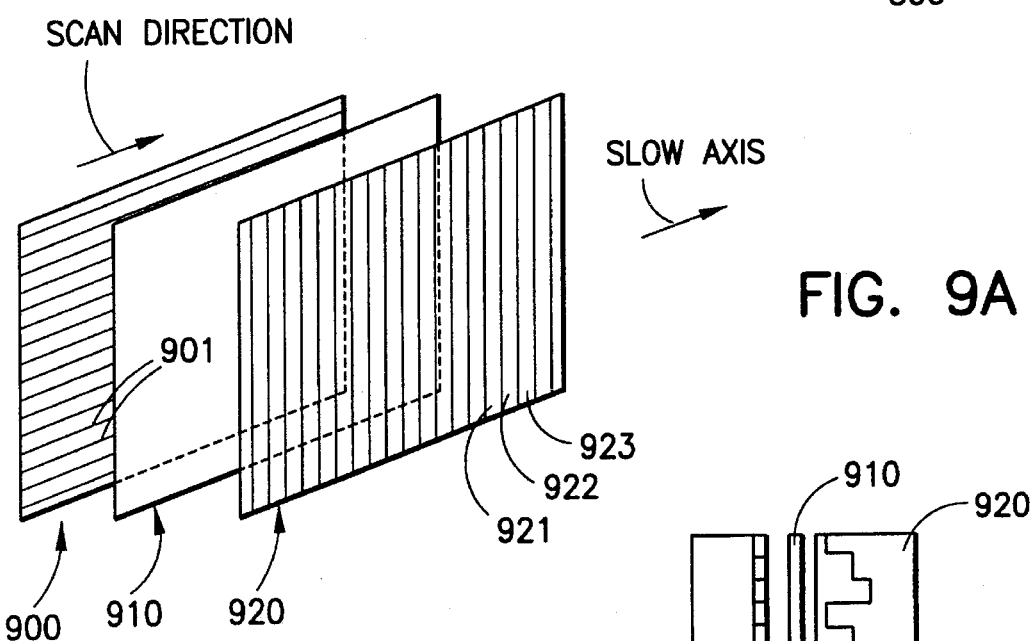
FIG. 9A is a schematic view of a polarization sensitive camera based upon a variation of color camera technology which is particularly suitable for use in the receive path.

In FIG. 9A, the camera pickup is represented by CCD chip 900 with typical scan lines 901. A thin linear polarizer 910 with polarization axis at 45 degrees to the "slow" axis defined for patterned retarder plate 920 is located touching, or in close proximity to the illuminated surface of the CCD chip. Retarder plate 920 is manufactured from a birefringent material and selectively etched so that adjacent columns differ by ¼ wave with respect to the retardation produced and a pattern of +,0,−,+,0,−,+,0,−, . . . is maintained where "+" represents +¼ wave (923), "0" represents equality of phase (922), and "−" represents −¼ wave (921). The patterned retarder plate must be in close proximity to the polarizing plate. The retarder plate selective etching may be done chemically or with ion beams and is well known in the semiconductor industry. The process is currently being used to create micro lens arrays known as binary optics.

Figure 9B:
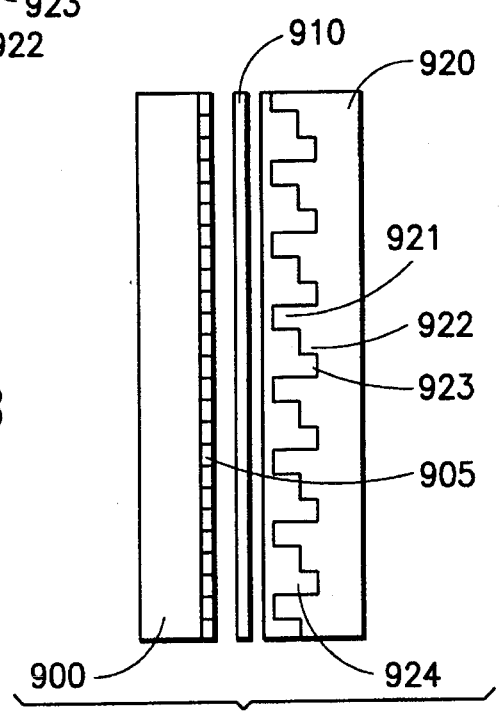
FIG. 9B is a section view of details of the polarization sensitive camera.

The arrangement shown in FIG. 9B requires two mask and etch steps to obtain the three thicknesses needed for manufacturing the three retardations needed for the three column types. The optional filling 924 adds non birefringent material having an optical index approximately equal to that of the birefringent material to provide the overall structure of a thin glass plate with respect to a focused light beam. As shown in FIG. 9B, the columns are brought into alignment with the pixels 905 in a CCD column in exactly the same manner as is done for a color camera.

In operation, the polarization images produced by the patterned retarder plate will be processed by the color camera's electronic circuits into either three separate images or a single composite image. In the case that a single composite image results, it can be decoded by any color receiver into corresponding R,G,B images which will represent not the three colors but the three states of circular polarization received which correspond to left, right and non polarized. These images may be processed according to all of the preceding methods regarding ice detection.

Although all cameras shown have been of rectangular format, in some circumstances it may be preferable that a linear camera array (single row of pixels) be used and the field of view be transversely scanned via rotating polygon mirrors, galvanometers, rotating prisms, or other scanning means to synthesize a rectangular image of some desired format. At such times the illuminator may provide a "line of light" which would be likewise scanned in synchronism with the scanning of the linear array. This is suitable for fields of view which may be long and narrow and require more resolution than may be obtained from the standard camera format.

Figure 13:
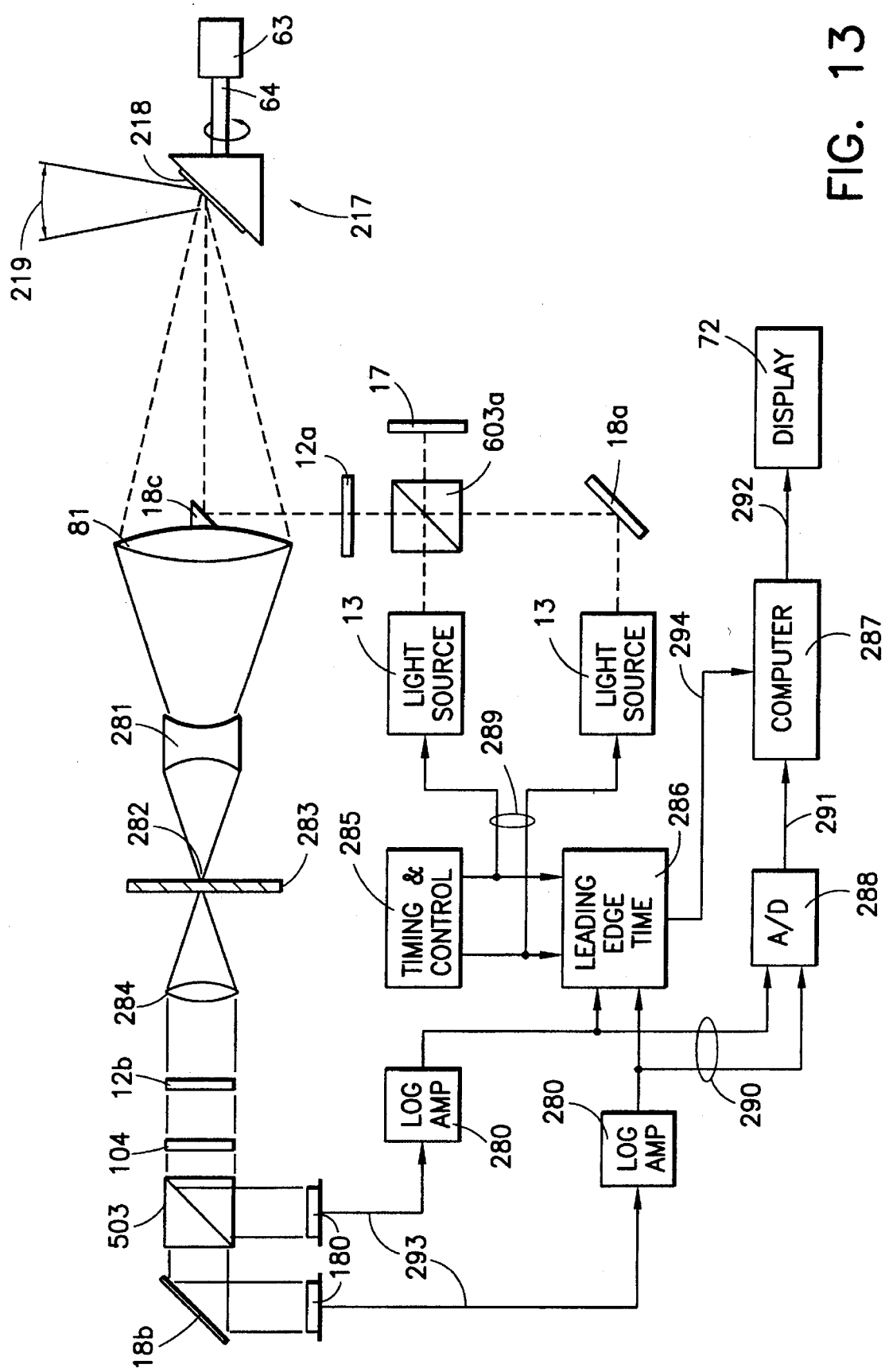
FIG. 13 is a schematic of a scanning narrow beam ice detection system.

FIG. 13 shows a scanning ice detection system. A laser diode light source 13, such as Spectra Diode Laboratories SDL 5422-H1 capable of producing short, bright pulses of light, is projected onto path folding mirror 18*a* which reflects the light pulses through polarizing prism 603*a* (a linear polarizing plate could be used when using just one light source 13). Prism 603*a* linearly polarizes the light, reflecting the unwanted orthogonal polarized light to be absorbed by absorber 17. The linearly polarized light passes through quarter wave retarder plate 12*a*, converting the light to circular polarization. Mirror 18*c* mounted on lens 81 folds the light path to coincide with the receiver light path.

A galvanometric scanner 217, such as Laser Scanning Products GRS-PS, series scans the light over an angle 219 in the horizontal plane via oscillating mirror 218. Scanner 217 is rotated in the vertical plane by motor 63 driving shaft 64, causing the horizontally scanned light to also scan vertically. Light reflected by a surface illuminated by the scanned light retraces the path to a positive lens 81 which focuses the light in combination with a negative lens 281 onto pinhole 282 in barrier 283. Light passing through pinhole 282 is focused by a lens 284 upon avalanche photodiodes 180 (such as the 5 mm avalanche photo-diodes found in the Advanced Photonix APM-10 Detector modules) after passing through quarter wave retarder plate 12b and polarizing prism 503. Mirror 18b folds the light path. Plate 12b converts the circularly polarized light to linearly polarized light, which if aligned with the polarization axis of prism 503 passes through to mirror 18b and one diode 180. If the polarized light is orthogonal to the polarization axis of prism 503, it will be reflected to the other diode 180 by prism 503. Unpolarized light will illuminate the photodiodes 180 equally whereas proper alignment of the circularly polarized light from light source 13, prism 503 and plate 12b can produce a maximum difference in light levels on one diode 180 relative to the other diode 180 when light projected by the system is specularly reflected. Narrow band interference filter 104, centered about the wavelength of light source 13, reduces the amount of ambient light which reaches photodiodes 180.

Quarter wave retarder plates 12a and 12b may be removed from the system and the system will then use linearly polarized light to produce a large ratio difference in light levels on photodiodes 180 for specular reflections and equal light levels on photodiodes 180 for unpolarized reflections.

An alternative system adds a second light source 13 which passes light aligned to the polarization axis of prism 603a onto absorber 17 and projects light orthogonal to the polarization axis of prism 603a which is reflected by prism 603a through plate 12a along the same path as the other light source 13 by careful alignment. The polarizations of the light from the two sources 13 are of opposite hands so that only one diode 180 is required to detect the large ratio of light reaching the diode from the two sources when reflected by a specular surface. The unpolarized light reflected from either source 13 will reach a diode 180 with equal intensity if the source 13 levels are equal. The galvanometer's mirror will typically scan 3 meters in 1/400 sec or equivalently travel 0.012 cm in the time between strobing the two light sources 13/100 nsec apart. Thus the diode receives light reflected from essentially the same area from the two sources. As previously noted, plates 12a and 12b may be removed.

When one light source 13 and two photodiodes 180 are used, the diode receiving the large specular reflected light may tend to heat up and alter any calibration of signal level. Using two diodes and two light sources 13 can reduce this problem. By alternately strobing the light sources 13, the heating will be equal since the large specular energy will alternate between photodiodes 180.

Although the equipment described separates clear wing from ice and snow, it does not separate (except visually to the operator's eye) runway and other background surfaces from wing surfaces, etc. This can be done via image processing techniques or stereo ranging or lidar (optical radar) ranging. Also, image processing techniques to be employed can segment surfaces of like texture and only color red those "non-blinking" areas that are substantially surrounded by "blinking" areas (green). That is, ice would be highlighted only when substantially surrounded by clear metal. As an alternative, stereo ranging may be used to separate foreground from background and only the foreground (wing or other aircraft surface) have non-blinking areas tagged to highlight ice formation.

Figure 14:
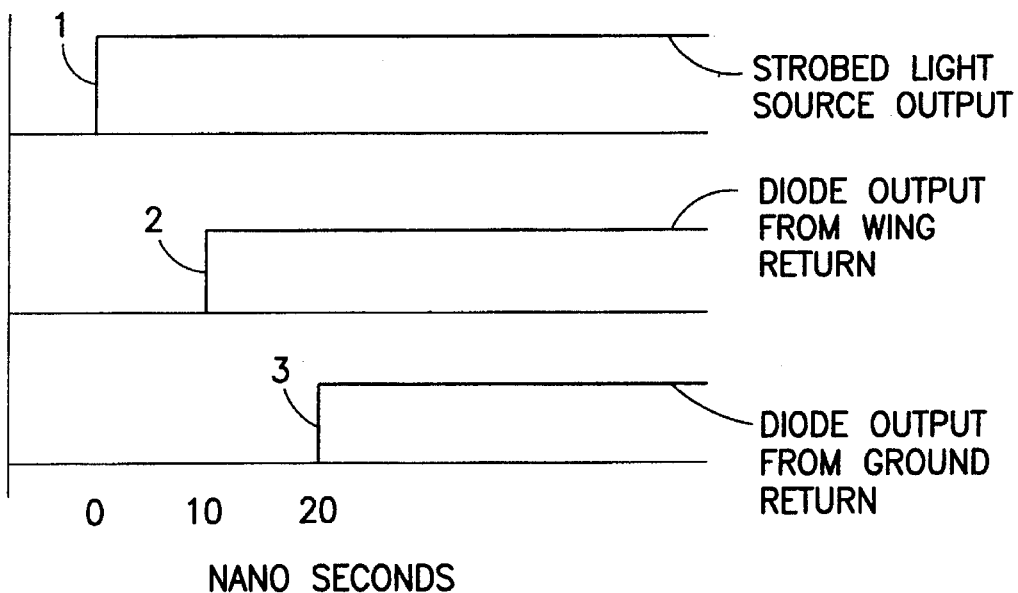
FIG. 14 depicts the time relationship of waveforms within the system as a function of surface distance.

When viewing downward on an aircraft wing, the ground appears in the field of view and returns unpolarized light similar to ice. One method of rejecting this unwanted signal is to use the time of travel of the light pulses to determine which surface is reflecting the light. If the wing is at least 5 feet above the ground, the ground signal will reach the diode 180 at least 10 nsec later (curve 3, FIG. 14) than a signal from the wing (curve 2) relative to the time of the strobe 289 (curve 1). Thus any signal exhibiting this additional delay can be rejected as not belonging to the wing. Since the measurement can be made on the leading edge by measurement unit 286, pulses wider than 10 nsec can be used without effect on this rejection process.

The problem of large dynamic range of reflected light from specular surfaces is not as great for the scanning system since the dynamic range of avalanche photo diodes (such as used for the APM-10 detectors) is much larger than that which is available for most imaging cameras. To deal with the large dynamic range of the output of these diodes, it is preferable to use a logarithmic amplifier 280 such as model AD640 from Analog Devices. Since ratios of signal levels are being analyzed, the log amplifier has the additional benefit of producing the same voltage change for a fixed ratio throughout the dynamic range.

A further problem, common to both scanning and non-scanning systems, is that the ratio of measured values in the isolator and non-isolator states reduces towards that of ice as the viewing angle deviates significantly from normal incidence when viewing a specular surface. This increases the difficulty in processing signals over a wide dynamic range.

To further overcome the influence of wide dynamic range on the display produced by the system, the display of the images can be enhanced by processing via computer 287 the signal level produced by each pixel in the image of camera 80 or by photodiodes 180 and to quantize the display for that pixel (or scan point for the scanning system) into three levels: clear, ice and non-ice. A background reference level is obtained for the pixel (or scan point) when the light source 13 is not being strobed. This will account for any ambient light. The short strobe time possible with the scanning system essentially eliminates interference by ambient light. The measurements are then made for the pixel (or scan point) by strobing twice; once with the optical means in the light path between light source 13 and camera 80 (or diode(s) 180) in an optical isolator state and once in an optical non-isolator state. A predetermined table of threshold values as a function of the measured background reference level and the value measured in the non-isolator state is stored in computer 287. A further problem that can be addressed by the table is the reduced ratio of measured values obtained in the isolator and non-isolator states when viewing a specular surface significantly away from the surface normal. If the ratio of the non-isolator state value to the value measured in the isolator state exceeds the threshold value from the table, the pixel is declared to be in a clear area, otherwise it is declared to be in an ice area. If the isolator state measured value in the ice area is less than a given value, the pixel is declared to be in a non-ice area. By displaying on display 72 the three categories as black, white and grey, or various contrasting colors, the display readily conveys the desired information concerning the icing condition on wing surface 15.

Figure 16B:
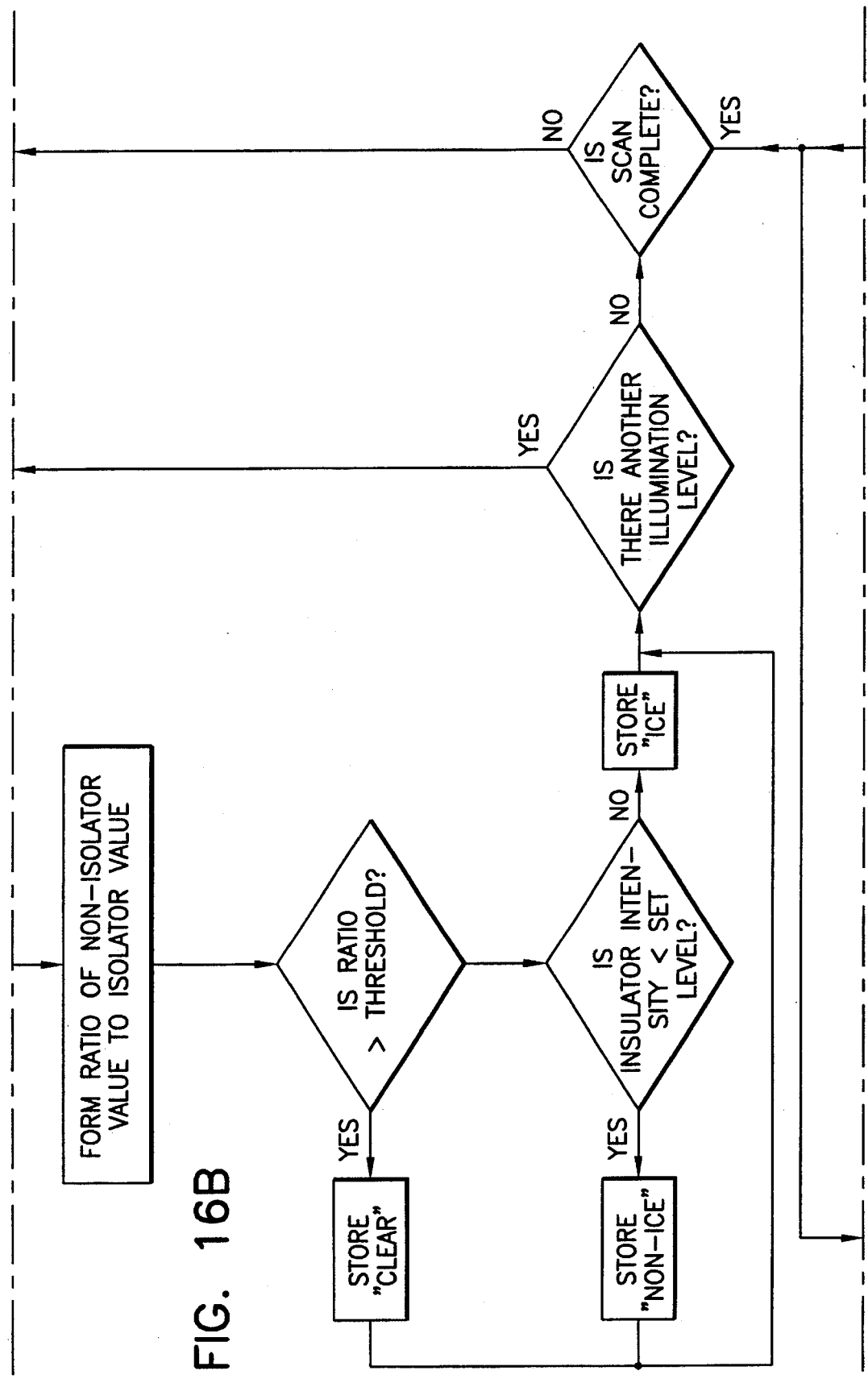
Figure 16C:
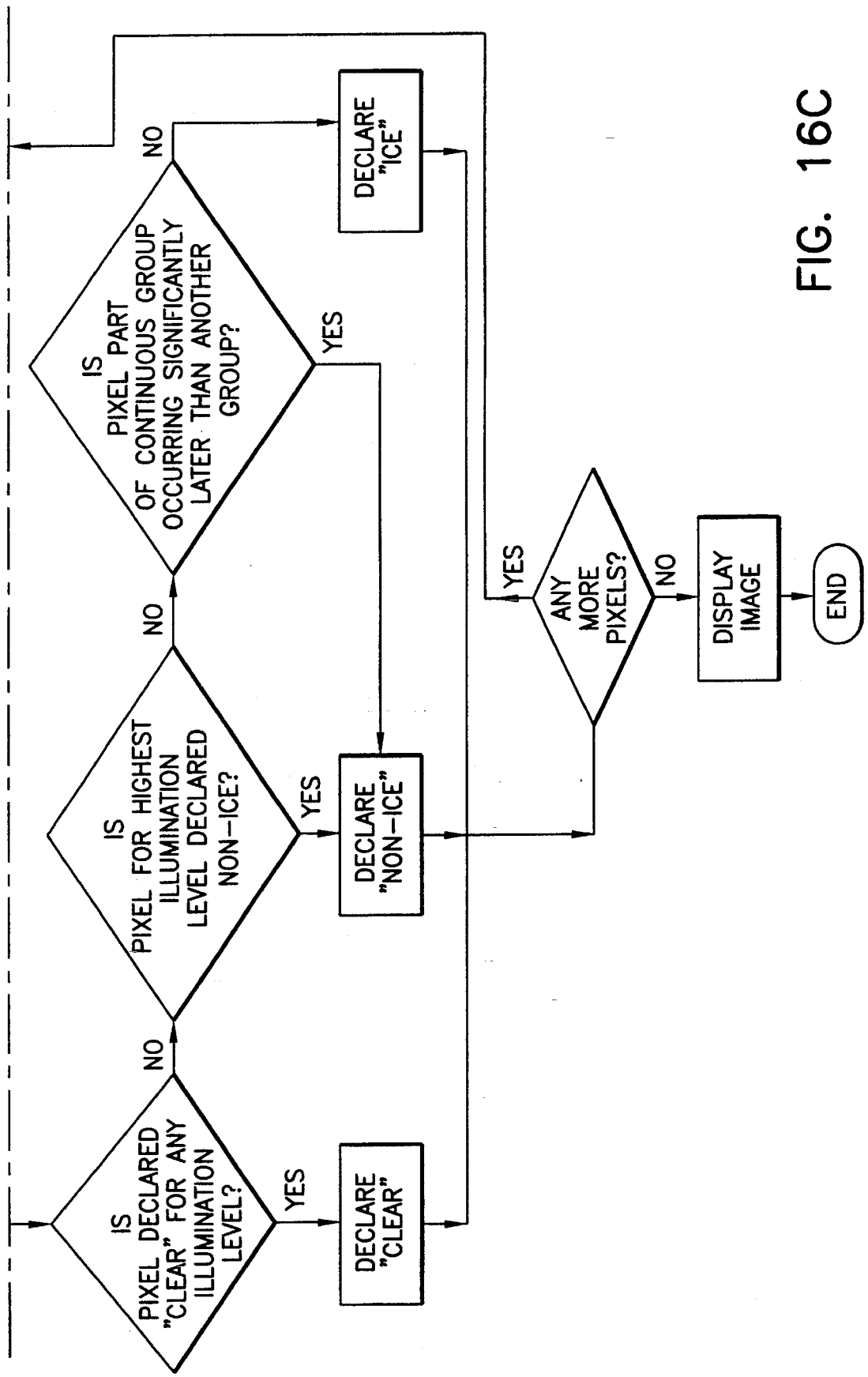

When multiple levels of illumination are used to increase the dynamic range of the system, the above method for quantizing the measurements into three levels will tend to declare "ice" for one or more of the levels when the declaration should be "clear". Thus if a declaration of "clear" is made at any level of illumination, the pixel is declared in a first decision to be in a clear area. The measured value in the isolator state with the highest illumination is used in a second decision to determine "non-ice" in areas not declared "clear" by the first decision. If time of arrival is used to eliminate ground returns, then those signals of a continuous group that are received significantly later than signals of another continuous group are declared "non-ice". A process flow diagram is provided in FIGS. 16A–16C for the steps described above.

FIG. 13 provides the details of the scanning system signal flows indicated above. Timing and control unit 285 synchronizes strobes 289 to the oscillating mirror 218 (synchronizing signal not shown). Strobes 289 cause light sources 13 to emit light pulses. Logarithmic amplifiers 280 receive diode 180 output signals 293 and send their compressed dynamic range outputs 290 to analog to digital converter 288 and leading edge measurement unit 286. Leading edge measurement unit 286 starts measuring time at the time of strobe 289 and stops when input signal 290 exceeds a given value. The time interval thus measured is transmitted to computer 287 via signal 294. Analog to digital converter 288 reports the amplitude measured on input signal 290 to computer 287 via signal 291. Computer 287 quantizes input signal values 291 into categories of clear, ice and non-ice as described above, using leading edge time on signal 294 to force background signals to be classified as non-ice. The categories are transmitted to display 72 via signal 292 from computer 287 to provide a visual image of wing 15 and ice patches 16.

Figure 17A:
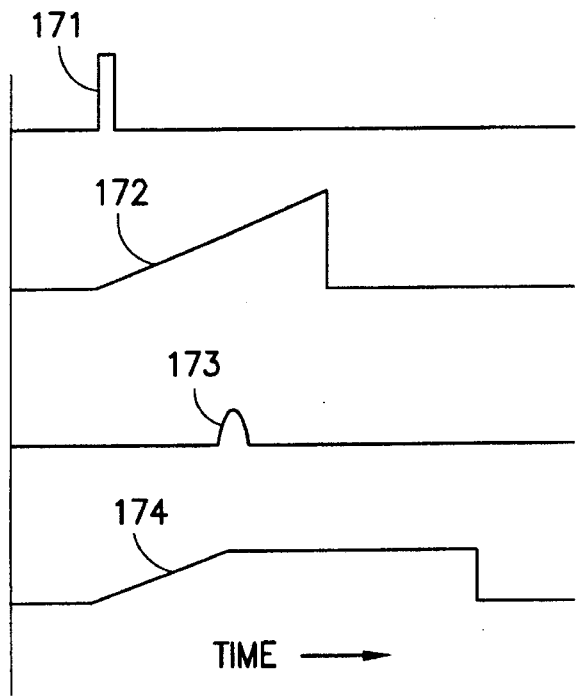
FIG. 17a shows the waveforms for an analog system for determining leading edge delay.

Leading edge measurement unit 286 can use any standard processing means that provides adequate time resolution. FIG. 17a illustrates the waveforms of an analog embodiment. Strobe 289 from timing and control unit 285 is shown as pulse waveform 171 which establishes time=0 for measuring time of travel for light to reach surface 15 and return to photodiodes 180. A sweep voltage having waveform 172 is started at the leading edge of pulse 171. The waveform 173 of the output 290 of amplifier 280 is compared to a threshold and triggers a track and hold circuit to sample the sweep voltage (or alternatively just stops the sweep) providing waveform 174. Waveform 174 is then converted to a digital value at time A by an A/D converter, where time A exceeds the maximum expected signal delay time.

Figure 17B:
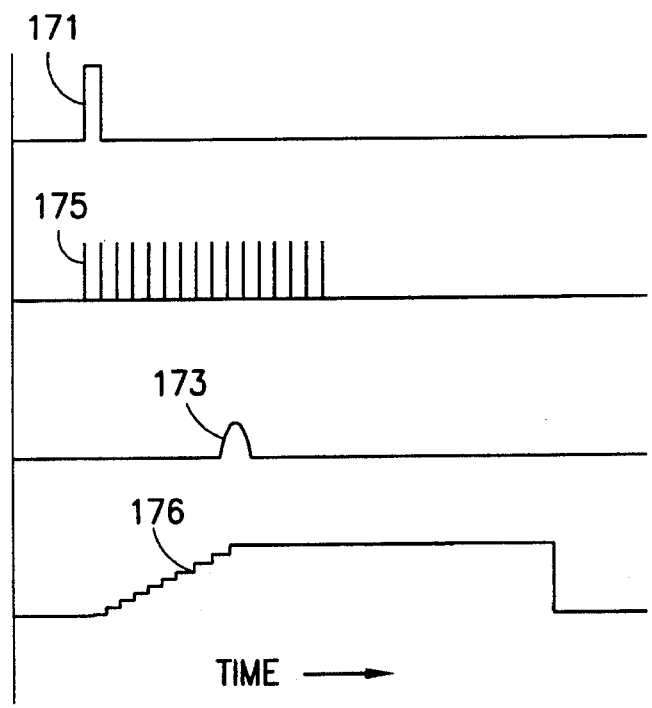
FIG. 17b shows the waveforms for a digital system for determining leading edge delay.

FIG. 17b illustrates an embodiment using a digital counter. Again, strobe 289 is shown as waveform 171 to establish time=0. Waveform 175 indicates the waveform of gated clock pulses that are turned on by the leading edge of pulse 171 and turned off after the maximum expected signal delay time. When amplifier 280 output 290 shown as waveform 173 exceeds a threshold, a counter counting the clock pulses is stopped and holds its count as indicated by waveform 176 (alternatively the clock pulses can be stopped when waveform 173 exceeds a threshold). At time A the counter value is sampled for use by computer 287.

The computer 287 can further improve the display by comparing the declared category of a pixel over several scans. If an indication of "clear" and "ice" alternates, then it can be concluded that ice has not formed and the sporadic declarations of "ice" are caused by blowing snow which can be displayed as "clear" or a fourth category.

As indicated above, a problem exists when viewing a wing surface at an angle significantly away from the surface normal. The ratio of the values measured in the isolator and non-isolator states approach that of ice, thus preventing reliable discrimination. Certain paints, materials and surface treatments can be applied to remove this deficiency.

Currently some aircraft wings are painted with a gray paint that provides a low ratio of isolator to non-isolator response. Adding 10% by volume of metal chips to the paint significantly improves the response but not as much as is desired. However, it has been found that a significant response improvement can be obtained by using black paint to which 10% by volume of metallic chips have been added. Surprisingly, an observer sees the appearance as similar to the gray paint, probably because the specular reflection of the metallic chips produces a gray appearance.

Figure 15:
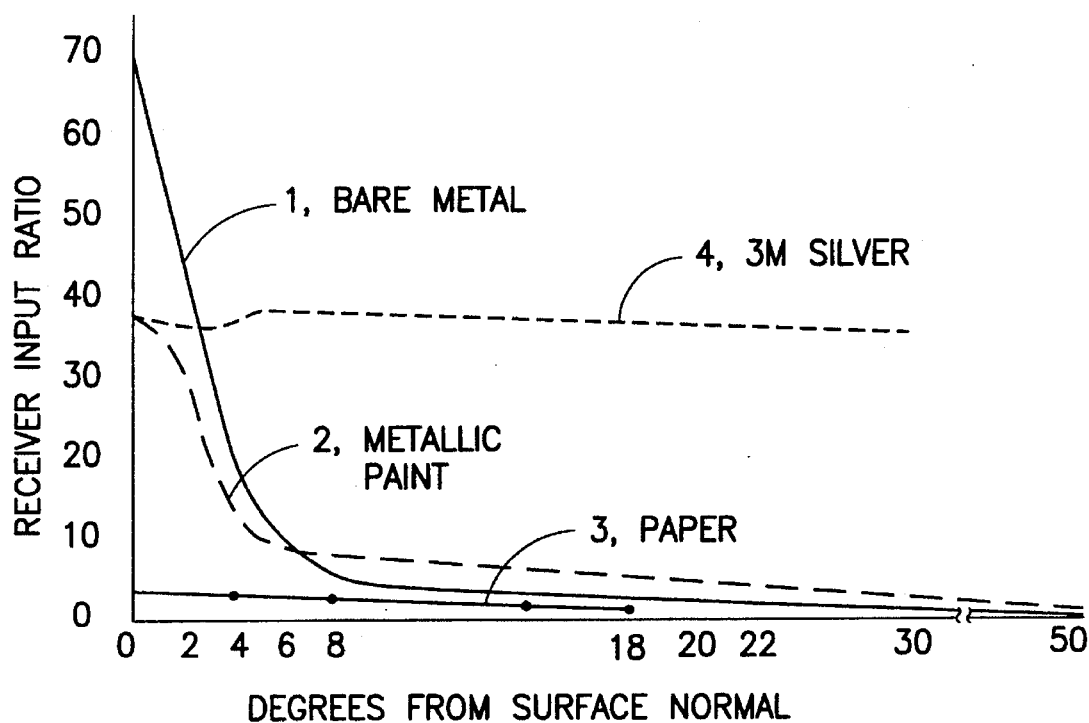
FIG. 15 is a graph depicting the receiver input ratio as a function of angle from surface normal for surfaces with different properties.

FIG. 15 shows the ratio of response obtained by the ice detection system when viewing various surfaces as a function of the angle the system makes to the surface normal. The bare metal curve 1 starts at a ratio of 66 on the surface normal and drops to 3 at 12 degrees from normal. Measurements of paper (curve 3) which is similar to that received from ice starts at 1.55 on the surface normal and drops to 1.47 at 12 degrees from normal. Thus at least a 2:1 difference in ratios exists out to 12 degrees from normal, and reliable discrimination is possible. Beyond that, performance becomes gradually less reliable.

Curve 2 is for a paint with approximately 10% metal chips added by volume which, when applied to the surface, provides a ratio of 3 out to 30 degrees from normal. Other currently existing aircraft paints provide a similar response.

Retroreflector tapes and paints that contain reflecting sites show very little sensitivity to the angle of view. Curve 4 shows that a surface covered by 3M silver provides a ratio greater than 27 out to 50 degrees from normal. 3M Reflective Highway Marking Tape series 380 (white) and series 381 (yellow) are used on roadways as reflectors and thereby provide the basis for detection of ice formation on roadways and bridges. Many of the suitable retroreflective tapes are manufactured by embedding tiny metallic coated dielectric beads in a clear plastic carrier. The tiny spherical beads reflect a portion of the impinging light back towards the light source, substantially independent of its direction. In fact, the reflected energy is generally much larger than required and can saturate the receiver. It is therefore preferable to add an attenuating layer of material to the surface of the retroreflective tape to reduce its response. An attenuation of approximately 3:1 each way is recommended as a best value (approximately 10:1 roundtrip loss).

Another method of reducing the sensitivity of response to angle from surface normal from a metallic surface is to cause the surface to present many small facets at all angles so that at any viewing angle a significant number of facets will have their surface normal essentially aligned to the viewing angle. Sand blasting, roll dimpling, etching and other methods are in common use to produce surfaces with this characteristic.

The invention is to facilitate ease of use and promote record keeping which is of vital importance to the aviation safety industry. Although not shown in the various drawings, it is anticipated that flight number, aircraft identification, time and date and other pertinent information would be aurally, visually, or textually annotated to the display monitors and to the disk or tape recordings made with the ice detection equipment. The performance of this task would be implemented with commercially available components that are often part of the equipment specified (cameras and recorders) or via additional "plug compatible" annotation and editing devices.

It may be desirable to locate the recording and viewing or control equipments at remote locations such as the aircraft cabin, control tower, ground control area, or aircraft terminal. Cameras and illuminators may also be built into various remote portions of the aircraft from which the wing or other surface is to be monitored. Accordingly, the various wires shown in the drawings, whether for purposes of data or signal transfer or control, may be replaced with telemetry equipment operating via radio, infra-red, power lines or fiber optic links.

In all claims and in the foregoing disclosure the term "light" is to be interpreted as "electromagnetic energy" and not restricted to just the visible light portion of the electromagnetic spectrum inasmuch as the principles described are not so limited and in fact extend into the infrared and beyond.

The precise ice-present/ice-free decision threshold for the ratio formed by the non-isolating state received signal amplitude divided by the isolating state received signal amplitude is a function of the angle between the normal to the viewed surface and the FIG. 13 equipment line of sight. The ice-free non-isolating to isolating ratio is a function of both angle and material as can be seen in FIG. 15 since the signal ratio of an ice-free surface point or area correlates strongly with these two variables. When the FIG. 13 or other similar equipment is used in the field, frequently the angle between the equipment optical path or material being viewed is unknown. Accordingly, it is useful to obtain a single threshold function for ice-detection that applies across a wide range of materials and angles so that precise knowledge of optical path angle or surface material is not required.

A one-time calibration can be made for a set of materials to obtain a function in which the threshold is primarily a function of the amplitude of the received light reflected from the surface or the material thereon with the optical element in the path in the non-isolator state. This is done by generating a curve for each material similar to that of FIG. 15, both for ice-free and ice-covered surfaces. Once such a curve is generated for a particular material, it need not be redone. Rather, the information so gathered can be combined with the information gathered for any other particular collection of materials that may be encountered in order to create an optimized decision boundary (threshold) for the ice-present/ice-free decision. The generation of such a curve is explained below.

When a predetermined set of materials will be encountered in the field, the information used to derive the curves of FIG. 15 can be plotted in a more useful manner by having (1) the amplitude (brightness) of the received reflected non-isolator optical state signal replace the angle as the abscissa and (2) the ratio, or other mapping function, of the relationship between the amplitudes of the non-isolator and isolator optical state received signals plotted as the ordinate. An angle is not necessarily the best auxiliary data to use with the non-isolating and isolating received reflected signal amplitudes to determine the threshold ratio at which the amplitudes of the received reflected signals are substantially equal (to indicate the presence of ice or snow). This is because it requires determining the local surface normal of the viewed region whose data is being evaluated with respect to the line of sight of the system receiver's sensor. Obtaining the local surface normal data requires obtaining accurate and relatively noise free range and position data for each small area in the subject surface that is to be evaluated. This is not always possible.

For metallic surfaces, the non-isolator received signal amplitude itself is indicative of the angle between the local surface normal and the receiver sensor line of sight. It is well known that when a viewed specular reflecting surface is normal to the line of sight of a coaxial receiver/transmitter arrangement, such as shown in FIG. 13, the return reflected beam will be extremely bright, i.e., a high amplitude received signal, and that when the specular surface deviates significantly from being normal to the line of sight the return beam will be much dimmer, i.e., a lower amplitude received signal. This is because most of the energy reflected from the surface will be directed away from the receiving lens of the receiver. In a similar manner, when surface 15 of FIG. 3B is in such a position and at such an angle that the rays emerging from the source illuminator are specularly reflected by the viewed surface directly into the receiving lens, the amplitude of the non-isolating state received signal will be extremely strong. Conversely, when this optimally specular arrangement is farther from being satisfied the received signal energy amplitude will rapidly fall off in intensity. Thus, the deviation of the angle from the optimum normal specular arrangement between the illuminating source and the reflecting surface and the receiving lens and the surface may be roughly inferred from received signal amplitude information.

Figure 18:
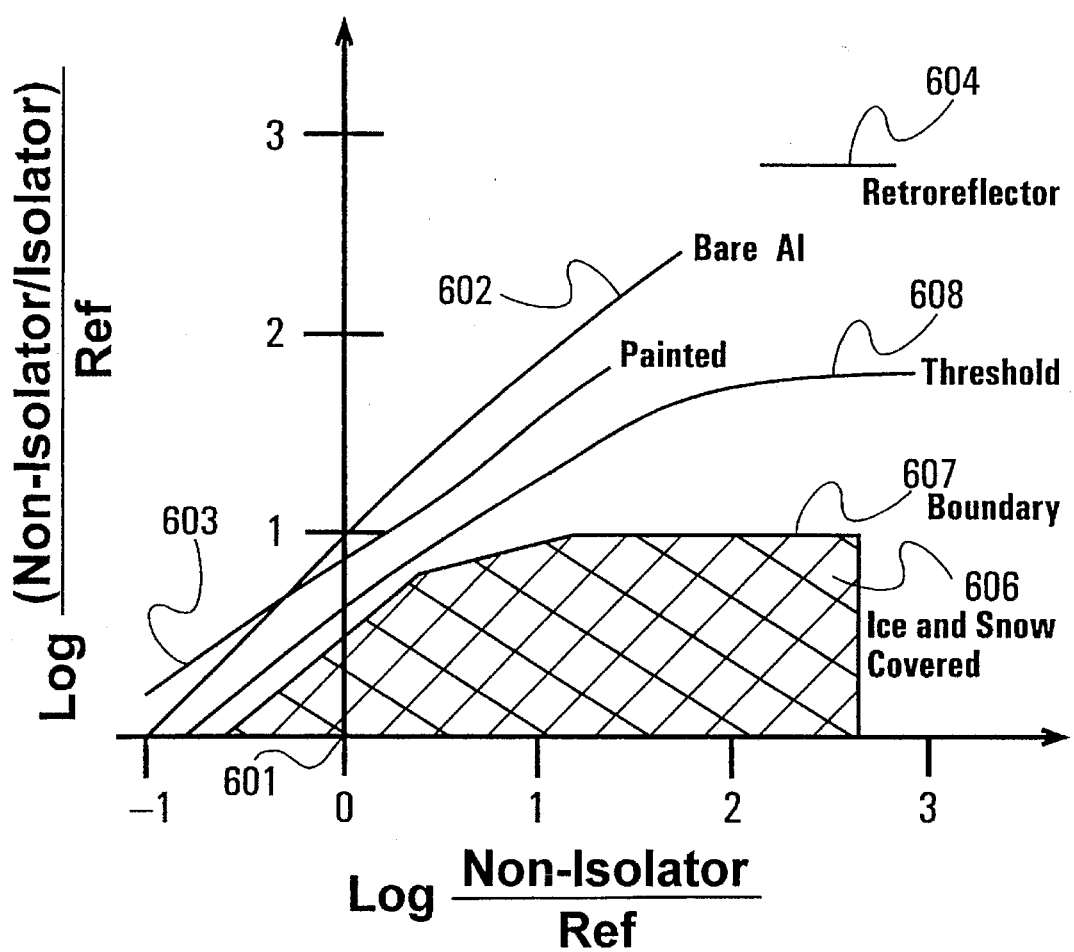
FIG. 18 is a graph plotting the non-isolator/isolator state received signal amplitude value ratio against the non-isolator state value.

FIG. 18 is a plot indicative of the ratio obtained by dividing the received signal amplitude observed in the optical non-isolator (non-blocked) mode by the received signal amplitude obtained in the isolator (blocked) mode versus the non-isolator mode received signal amplitude for the various materials indicated. Since a large dynamic range must be covered for both the non-isolator signal amplitude and the non-isolating/isolating signal ratio, the FIG. 18 plot is presented in a logarithmic scale for both axes. It is also normalized with respect to a reference diffusing white lambertian surface; e.g., a surface with near unity reflectance that returns nearly equal energy in both the optical isolating and non-isolating modes. This is, for example, white paper. This reference point is the origin 601 of the FIG. 18 graph.

The portion of the curves for each material that lie towards the positive most portion of the abscissa, i.e., to the right of the origin, are those points that most nearly correspond to receipt of specular reflection of light normal to the receiver sensor, such as shown in FIG. 13, since they correspond to the largest amplitudes of received reflected signals and are far larger in amplitude than the amplitudes of reflected signals that would be obtained from a white diffuse surface. Points on the curves that lie to the left of the ordinate (left of the origin) correspond to specular surfaces that are far from being normal to the receiver (e.g., FIG. 13) sensor axis and therefore have signal amplitude returns weaker than would be obtained from a white reference surface. The area 606 with boundary 607, which corresponds to the region where received signal amplitude from ice covered metallic surfaces occur, is cross hatched.

A threshold curve 608 which may be used to separate ice and snow covered surfaces from clean metallic wing surfaces is drawn between the cross hatched area and the "clean wing curves" for bare aluminum 602, metallic paint 603 and retroreflective material 604.

The data for the curves shown in FIG. 18 may be obtained by recording the isolator and non-isolator state received signal amplitude responses obtained with the equipment of FIG. 13 or FIG. 3B (the eye being replaced with a photo detector) over a wide selection of angles between the ice detection sensor and the surface at a fixed working distance for each such material or surface condition that is to be investigated. This is most advantageously done by rotating the viewed surface about an axis that is normal to the sensor axis and passes through the sensor axis. After the mathematical computations are made the curves are plotted from these data. The data are taken at constant range to ensure that the signal amplitude obtained in the non-isolator mode is not altered by the change in the working distance. Otherwise, appropriate corrections must be made for such range variation which will generally be in accordance to the inverse square of distance.

When the ice detection equipment is used at an approximately constant working distance from the surface being inspected the curves of FIG. 18 may be used to determine the threshold between ice or snow present and ice-free conditions. During investigation of a surface, at the receiver sensor each pixel group or pixel, respectively, corresponds to a surface area or point, respectively, and is associated with an optical non-isolator and an isolator pair of received signal amplitude numbers as the system alternates between non-isolator and isolator states. In the case of a pixel group, each number of the pair of numbers will normally be the average or otherwise filtered value representative of the non-isolator or isolator state received signal amplitude of the group of pixels. The value of the non-isolator number of the pair may be used for the entry point (corresponding to the abscissa of the FIG. 18 graph) into a table (or function) that represents the threshold curve 608 of FIG. 18. If, at the point of entry set by the non-isolator number, the ratio of the non-isolator amplitude number of the pair of numbers to the pair isolator number lies above the threshold 608, it is concluded that the surface is ice free. Conversely, if the computed ratio lies below the threshold value for that entry point it is concluded that the surface is not ice free.

In actual construction of such a table or function, the origin may be set at any convenient point. Use of white paper (reflectance equal to unity) as an origin is convenient primarily for human interpretation. Such an origin puts strongly specularly reflected light to the right of the ordinate and weakly reflected light (specular or non-specular) to the left. Similarly, increasing specularity is defined by light at increasing distances above the abscissa. The computation and curve evaluations of received signals are easily carried out during actual system use by use of a computer which includes a look up table.

When the detection equipment is not used at constant working distances from the surface being investigated, the table or function based on the FIG. 18 threshold curve 608 still may be used but it must be entered (abscissa) via an offset that takes into account the range to the surface being viewed versus the range at which the table was constructed. For instance, if the table or function was constructed from data collected at a range of 16 feet and the distance to the surface being interrogated is 32 feet (twice the distance) the received signal amplitude (for the FIG. 13 sensor) will be approximately ¼ of that at the 16 feet (reference) distance.

Unlike a similar calculation for radar or sonar, only the one way distance need be taken into account since all of the area illuminated by the transmitter source is imaged by the receiver lens onto its detector surface. Thus, if the object surface is at twice the reference distance, the lens of the receiver detector will subtend ¼ the solid angle as viewed from the illuminated surface point and will collect only approximately ¼ of the reference energy. Accordingly, to enter the table at the proper place it is necessary to perform the look-up or function evaluation at four times the actual amplitude of the measured received signal. Therefore, if logarithms to the base 10 are used in the graph plot, the log of 4 would be added to the log of the non-isolator pixel group number received signal amplitude value to obtain the (abscissa) entry point because adding the log of 4 is equivalent to multiplying by 4. The same correction applies when either taking data with ¼ of the transmitted power or with ½ of the receiver aperture diameter. The ratio of the non-isolator pixel or pixel group amplitude number value to the isolator number value is found by subtraction when using the equipment of FIG. 13 since both values are obtained as logarithmic quantities via logarithmic amplifiers 280. Of course, this ratio is only a property of the surface material and condition and angle and is therefore not changed with distance.

Figure 19:
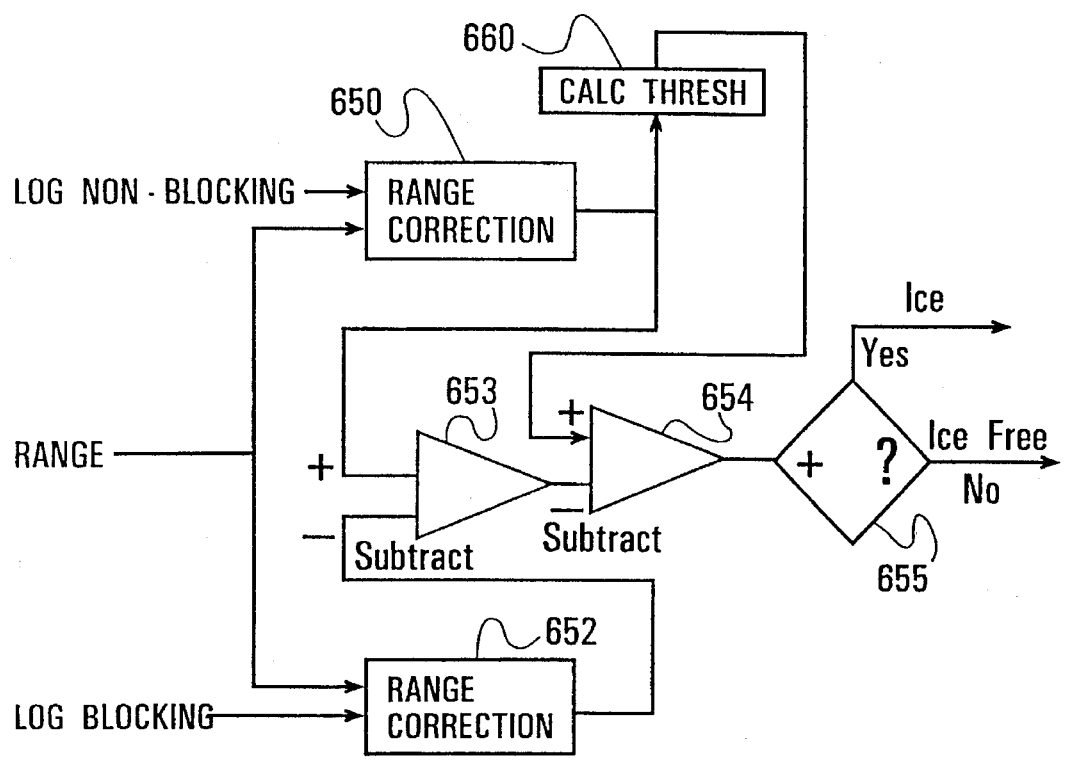
FIG. 19 is a schematic diagram of a circuit for implementing the surface condition determining condition in accordance with FIG. 18.

FIG. 19 shows a circuit by which the ice/no-ice decision is made for either a group of pixels or for a single pixel. Inputs to the circuit are the respective non-isolator and isolator mode received signal amplitude values, preferably in logarithmic terms, and the range (distance) from the ice detection apparatus receiver to the surface. The range signal amplitude value may be that which is available for the pixel or group of pixels under consideration or the average distance to the surface being scanned (examined) in those cases where localized range data are not available. Range data to the center of the field under observation also may be input via an external ultrasonic or laser rangefinder, both of which are commonly available, or via an operator estimated manual input.

The non-isolator and isolator log amplitude values for the region under consideration are first corrected for range by adding or subtracting an amount that corresponds to the deviation of the current range from the reference range. (The reference range is that used when the threshold value function or table for the desired set of materials was computed). This correction is performed in the range correction circuits 650 and 652, which can be, for example, operational amplifiers if the circuit is of the analog type. If the signal amplitude values are in digital form, digital computation components are used. The term K*LOG(RANGE/REF RANGE) is an offset in the operation of the calculation circuit 652. The value of K used in circuit 652 is normally equal to "2" but may vary to account for any non-linearities or other deviations in the system from the ideal model.

The computed corrected non-isolator received signal amplitude is used as the entry point to a prestored curve fit formula in the threshold calculator 660 that approximates the threshold curve 608 of FIG. 18 or as a lookup into a table that has data corresponding to the same function. The output of a subtraction circuit 653, which receives the non-isolator received signal amplitude and the isolator signal amplitude in logarithmic form, is the log of the ratio of optical power detected in the non-blocking and blocking states, respectively. The threshold amount, the value of curve 608 at the entry point, is then compared with the non-isolating/isolating ratio signal (both corrected or both uncorrected) in the subtraction circuit 654.

The output of subtraction circuit 654, being positive, leads to a declaration of ice in a decision block circuit 655, since a positive result only occurs when the ratio of the non-isolator to isolator signal amplitude is smaller than the threshold value; i.e., the ratio lies below the threshold curve 608 of FIG. 18. A negative output from subtraction circuit 654 conversely leads to an ice-free decision by decision block 655, since it is indicative of a ratio greater than the threshold value.

Figure 20:
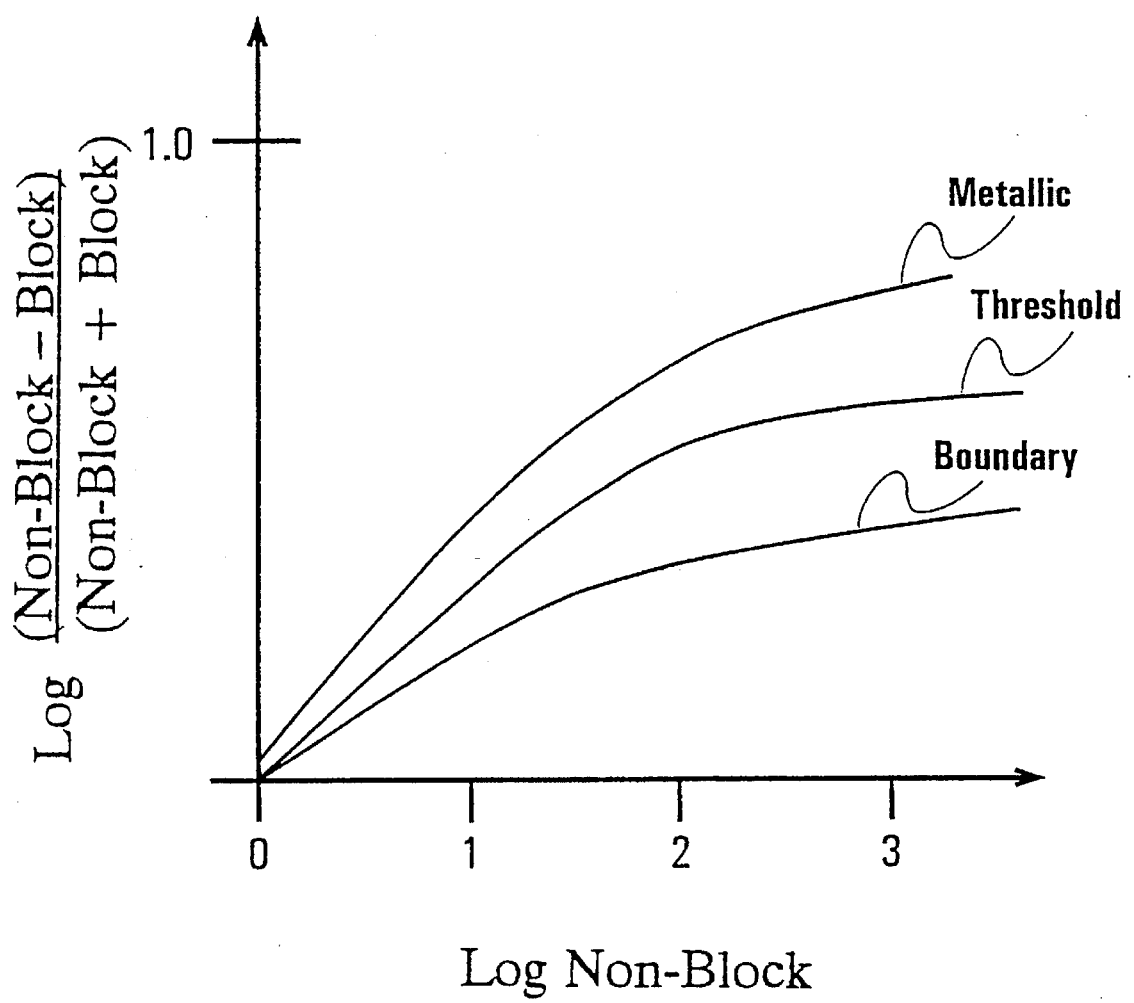
FIG. 20 is a graph plotting the ratio of the sum and differences of the non-isolator and isolator data received signal amplitude values against the non-isolator state value.

Although the ratio of non-isolator to isolator received signal amplitude has been plotted in FIG. 18 as being indicative of an ice or no-ice decision, it is only one of a number of potential evaluation functions that can be used to make the ice or no-ice decision. For example, another useful evaluation function may be formed by using as the ordinate of the curve the values of the difference of the two logarithmic values (non-isolator and isolator optical state values) divided by the sum of the two logarithmic values and plotting this function for a given set of materials. A simplified plot is shown in FIG. 20. The advantage to using an evaluation function of this type is that the range of results is restricted to values between "0" and "1" which may then be scaled to any convenient range such as 0–255 for use in digital computation, i.e. $256=2^8$. Negative numbers are not needed because the log of the non-isolator amplitude is normally equal to or larger than the log of the isolator amplitude.

Figure 21:
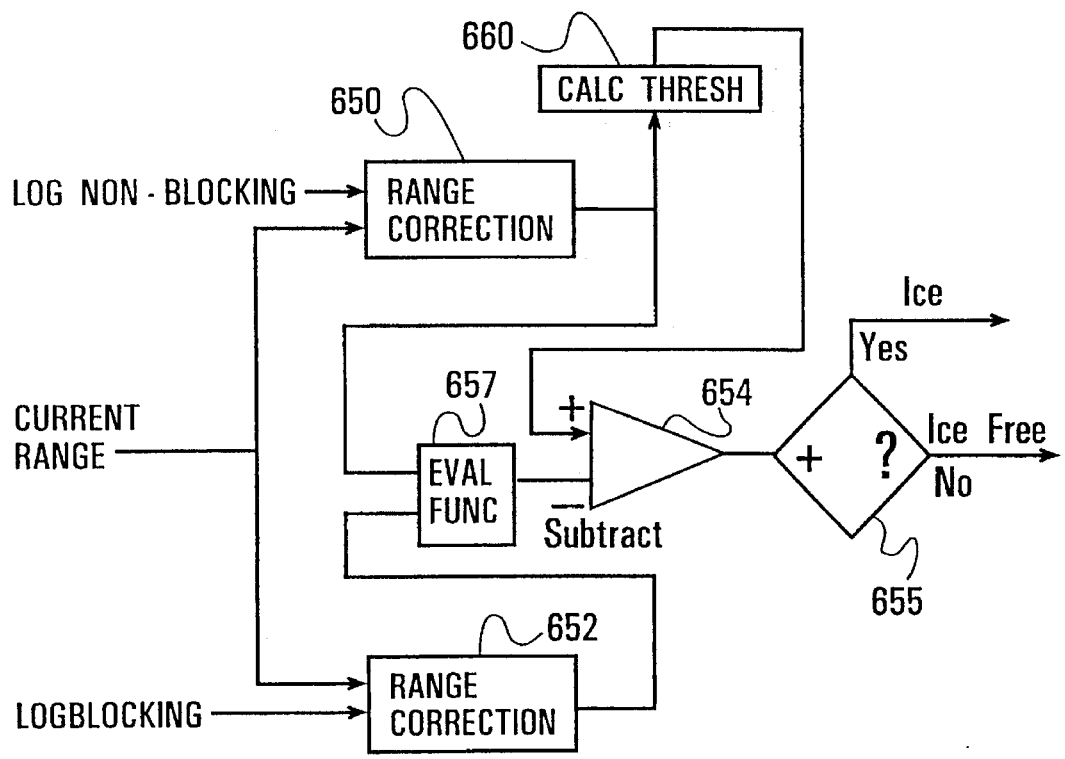
FIG. 21 is a schematic diagram of a circuit for implementing the surface determining conditions in accordance with FIG. 20.

A block diagram of a circuit required to make the ice-no ice decision in accordance with the evaluation function of FIG. 20 is shown in FIG. 21. This circuit is the same as that of FIG. 19, except that the subtraction circuit 653 is replaced with a function evaluation circuit 657 for the value difference divided by the value sum computation.

The operation of the circuit of FIGS. 19 and 21 are preferably performed in specialized hardware when a very high speed of computation is required. Otherwise, they may be performed by a general purpose computer.

I claim:

1. A method for detecting on a surface which specularly reflects light, a presence of a polarization altering substance comprising the steps of:

transmitting light over a transmitting path to said surface;

receiving said transmitted light over a receiving path for said transmitted light from said surface and from said substance alternately in optical isolator and optical nonisolator states;

measuring a first intensity of light received in said optical non-isolator state;

measuring a second intensity of light received in said optical isolator state; and comparing said first and second intensities of received light to a plurality of reference data to detect the presence of said substance on said surface.

2. A method as in claim 1 wherein the steps of measuring said first and second intensities of received light includes determining logarithmic values of said first and second intensities of received light.

3. A method as in claim 1 further comprising establishing said reference data by determining a ratio as a function of said first intensity of light when said surface is a known surface with said polarizing substance absent from said known surface.

4. A method as in claim 3 wherein the step of establishing said reference data further comprises determining a threshold value of said function, said threshold value representing a difference between different conditions of said surface.

5. A method as in claim 4 wherein one of said conditions of said surface is the presence of one of ice and snow and another condition an absence thereof.

6. A method as in claim 3 wherein said ratio is said first intensity of received light divided by said second intensity of received light, said first and second intensities of received light being measured when said surface is said known surface with said polarizing substance absent from said known surface.

7. A method as in claim 3 wherein said ratio is said second intensity of received light subtracted from said first intensity of received light divided by said second intensity of received light added to said first intensity of received light, said first and second intensities of received light being measured when said surface is said known surface with said polarizing substance absent from said known surface.

8. A method as in claim 3 wherein, during the steps for measuring said first and second intensities of received light, said transmitting path and said receiving path are substantially a same length as a distance from said surface used in establishing said reference data.

9. A method as in claim 1 wherein, during the steps for measuring said first and second intensities of received light, said transmitting path and said receiving path are a different length than a distance from said surface at which said reference data were established, and the step of comparing includes correcting for a difference between said distance and said different length.

10. A method as in claim 9 wherein the step of comparing includes correcting for said difference by adding to said first and second intensities of received light an amount corresponding to said difference.

11. A method as in claim 1 further comprising establishing said reference data by measuring said first and second intensities of received light when said surface is a known surface with said polarizing substance absent from said known surface, and said transmitting path and said receiving path are not parallel to each other.

12. Apparatus for detecting on a surface which specularly reflects light, the presence of a polarization altering substance comprising:

means for transmitting light over a transmitting path to said surface;

means for receiving transmitted light;

a receiving path for said transmitted light from said surface and from said substance to said means for receiving;

optical means in at least one of said transmitting path and said receiving path;

means for alternating said optical means between an optical non-isolator state and an optical isolator state;

said means for receiving including means for measuring a first intensity of light received at said means for receiving when said optical means is in said optical non-isolator state, and means for measuring a second intensity of light received at said means for receiving when said optical means is in said optical isolator state; and means for comparing said first and second intensities of light to a plurality of reference data to detect the presence of said substance on said surface.

13. Apparatus as in claim 12, wherein said reference data are in logarithmic form.

14. Apparatus as in claim 12, further comprising means for establishing said reference data by measuring said first and second intensities at a reference distance from said surface when said surface is a known surface with said polarization altering substance absent from said known surface.

15. Apparatus as in claim 14 wherein said means for establishing said reference data further comprises;

means for calculating a first ratio of said first intensity to said second intensity and making a first comparison of said first ratio to said first intensity when said polarization altering substance is absent from said known surface;

means for calculating a second ratio of said first intensity to said second intensity and making a second comparison of said second ratio to said first intensity when said polarization altering substance is present on said surface; and means for determining a threshold to establish a difference between said first and second comparisons representing different conditions of the surface being investigated.

16. Apparatus as in claim 15 wherein one of said conditions of said surface is the presence of one of ice and snow and another condition an absence thereof.

17. Apparatus as in claim 14 wherein:

said transmitting path and said receiving path are substantially a same length as said reference distance used by said means for establishing reference data.

18. Apparatus as in claim 14 wherein said transmitting path and said receiving path are substantially a different length from said reference distance and said means for comparing includes means for correcting for said different length.

19. Apparatus as in claim 14 wherein said means for establishing said reference data includes means for measuring said first and second intensities when said surface is a known surface with said polarization altering substance absent from said known surface at a plurality of angles with respect to a normal of said surface.

20. Apparatus as in claim 14 wherein said means for establishing said reference data includes means for measuring said first and second intensities at a plurality of angles with respect to a normal of said surface when said surface is a known surface with said polarization altering substance present.

21. Apparatus as in claim 12 wherein:

said means for transmitting light includes only one transmitter; and said means for receiving transmitted light includes at least one receiver.

22. Apparatus as in claim 12 wherein:

said means for transmitting light includes at least one transmitter; and said means for receiving transmitted light includes only one receiver.

23. Apparatus as in claim 12 wherein:

said means for transmitting light includes at least one transmitter; and said means for receiving transmitted light includes at least one receiver.

24. Apparatus for detecting on a surface which specularly reflects light, the presence of a polarization altering substance comprising:

means for transmitting light over a transmitting path to said surface;

means for receiving transmitted light;

a receiving path for said transmitted light from said surface and from said substance to said means for receiving;

optical means in at least one of said transmitting path and said receiving path;

means for alternating said optical means between an optical non-isolator state and an optical isolator state;

means for measuring a first intensity of light received at said means for receiving when said optical means is in said optical non-isolator state and outputting a first logarithmic signal;

means for measuring a second intensity of light received at said means for receiving when said optical means is in said optical isolator state and outputting a second logarithmic signal;

means, responsive to a length of said receiving path, for range-correcting said first and second logarithmic signals;

means for comparing said range-corrected second logarithmic signal to said range-corrected first logarithmic signal and outputting a ratio signal;

means for calculating a threshold signal; and means for comparing said ratio signal to said threshold signal.

25. Apparatus according to claim 24, wherein:

said means for comparing said range-corrected second logarithmic signal to said range-corrected first logarithmic signal includes a first subtraction circuit; and said means for comparing said ratio signal to said threshold signal includes a second subtraction circuit.

26. Apparatus according to claim 24, wherein said ratio signal represents a ratio of said second range-corrected logarithmic signal subtracted from said first range-corrected logarithmic signal to said second range-corrected logarithmic signal added to first range-corrected logarithmic signal.

\* \* \* \* \*